United States Patent
Lyon et al.

(10) Patent No.: US 9,170,317 B1
(45) Date of Patent: Oct. 27, 2015

(54) ALIGNING A RADIO FREQUENCY ANTENNA BORE SIGHT

(71) Applicant: L-3 Communications Corp., New York, NY (US)

(72) Inventors: Scott M. Lyon, South Weber, UT (US); Merle L. Keller, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 420 days.

(21) Appl. No.: 13/751,385

(22) Filed: Jan. 28, 2013

(51) Int. Cl.
*G01S 3/02* (2006.01)

(52) U.S. Cl.
CPC ..................................... *G01S 3/023* (2013.01)

(58) Field of Classification Search
CPC ............................. H01Q 1/1257; H01Q 3/08
USPC ................ 342/141, 359, 426, 427, 430, 140; 343/754, 757
See application file for complete search history.

(56) References Cited

U.S. PATENT DOCUMENTS

| | | | |
|---|---|---|---|
| 4,016,569 A | 4/1977 | Buebel, Jr. | |
| 4,873,526 A | 10/1989 | Katsuo | |
| 7,298,325 B2 | 11/2007 | Krikorian et al. | |

OTHER PUBLICATIONS

Hess, "Antenna Boresighting," (downloaded from the Internet in Sep. 2012 but the publication date is otherwise not known) 19 pages.

*Primary Examiner* — Dao Phan
(74) *Attorney, Agent, or Firm* — Kirton | McConkie

(57) ABSTRACT

Processes for determining imperfection offsets between an antenna and the platform to which the antenna is coupled, where the imperfection offsets are unknown offsets due to imperfections such as manufacturing imperfections. The platform can include an orientation mechanism that provides the orientation of the platform, and the imperfection offsets can be between the antenna and the orientation mechanism. The processes can include determining two different relative pointing vectors that correspond to a detected peak strength of a test signal transmitted between one or more targets and the antenna. The processes can further include utilizing an optimization process to determine the heading, pitch, and roll of the imperfection offsets from the two different relative pointing vectors.

24 Claims, 19 Drawing Sheets

Figure 22

$$\text{error} = \sqrt{(dEPV1_x - EPV1_x)^2 + (dEPV1_y - EPV1_y)^2 + (dEPV1_z - EPV1_z)^2 + (dEPV2_x - EPV2_x)^2 + (dEPV2_y - EPV2_y)^2 + (dEPV2_z - EPV2_z)^2}$$

2200

ALIGNING A RADIO FREQUENCY ANTENNA BORE SIGHT

BACKGROUND

A directional radio frequency (RF) antenna on a platform can be pointed at a target having a known location by moving the bore sight of the antenna with respect to the platform so that the bore sight is directed at the target. Due to such things as physical imperfections in the structures that mount the antenna to the platform, however, there can be unknown offsets between the heading, pitch, and roll of the platform (e.g., as provided by a navigation system attached to the platform) and the heading, pitch, and roll of the antenna. Due to such unknown offsets, the antenna typically does not point directly at the target. Rather, the antenna points askew from the target due to the unknown offsets. Past processes for compensating for such unknown offsets have proved inefficient. Embodiments of the present invention are directed to improved processes for determining and/or compensating for such unknown offsets.

SUMMARY

In some embodiments, a process for determining unknown offsets between a radio frequency (RF) antenna and a platform on which the antenna is mounted can include pointing the antenna at a first RF target in accordance with a first uncorrected relative pointing vector (uRPV1) that does not account for the unknown offsets. The process can also include rotating the antenna in an azimuth plane to determine a first delta azimuth angle ($\Delta Az_1$) from the uRPV1 that corresponds to a peak strength of the first test signal at the antenna or the first target and rotating the antenna in elevation to determine a first delta elevation angle ($\Delta Ev_1$) from the uRPV1 that corresponds to a peak strength of the first test signal. The process can further include adding the $\Delta Az_1$ and the $\Delta Ev_1$ to the uRPV1 to produce a first corrected relative pointing vector (cRPV1). The process can also include pointing the antenna at a second RF target in accordance with a second uncorrected relative pointing vector (uRPV2) that does not account for the unknown offsets; rotating the antenna in the azimuth plane to determine a second delta azimuth angle ($\Delta Az_2$) from the uRPV2 that corresponds to a peak strength of the second test signal at the antenna or the second target; rotating the antenna in elevation to determine a second delta elevation angle ($\Delta Ev_2$) from the uRPV2 that corresponds to a peak strength of the second test signal; and adding the $\Delta Az_2$ and the $\Delta Ev_2$ to the uRPV2 to produce a second corrected relative pointing vector (cRPV2). The process can further include determining from the cRPV1 and the cRPV2 a heading angle ($\alpha_t$), a pitch angle ($\beta_t$), and a roll angle ($\gamma i$) of the unknown offsets.

In some embodiments, a process for determining unknown offsets between a radio frequency (RF) antenna and a platform on which the antenna is mounted can include disposing the platform in a first orientation in an earth fixed coordinate frame, and pointing the antenna at an RF target in accordance with a first uncorrected relative pointing vector (uRPV1) that does not account for the unknown offsets. The process can further include rotating the antenna in an azimuth plane to determine a first delta azimuth angle ($\Delta Az_1$) from the uRPV1 that corresponds to a peak strength of the test signal at the antenna or the target and rotating the antenna in elevation to determine a first delta elevation angle ($\Delta Ev_1$) from the uRPV1 that corresponds to a peak strength of the first test signal. The process can further include adding the $\Delta Az_1$ and the $\Delta Ev_1$ to the uRPV1 to produce a first corrected relative pointing vector (cRPV1). The process can also include moving the platform into a second orientation. The process can then include pointing the antenna at the target in accordance with a second uncorrected relative pointing vector (uRPV2) that does not account for the unknown offsets; rotating the antenna in the azimuth plane to determine a second delta azimuth angle ($\Delta Az_2$) from the uRPV2 that corresponds to a peak strength of the second test signal at the antenna or the target; and rotating the antenna in elevation to determine a second delta elevation angle ($\Delta Ev_2$) from the uRPV2 that corresponds to a peak strength of the test signal. The process can then include adding the $\Delta Az_2$ and the $\Delta Ev_2$ to the uRPV2 to produce a second corrected relative pointing vector (cRPV2), and determining from the cRPV1 and the cRPV2 a heading angle ($\alpha_t$), a pitch angle ($\beta_t$), and a roll angle ($\gamma_t$) of the unknown offsets.

BRIEF DESCRIPTION OF THE DRAWINGS

FIG. 22 shows an equation for calculating an error value for a selected set of imperfection heading, pitch, and roll.

DETAILED DESCRIPTION OF EXEMPLARY EMBODIMENTS

Figure 1:
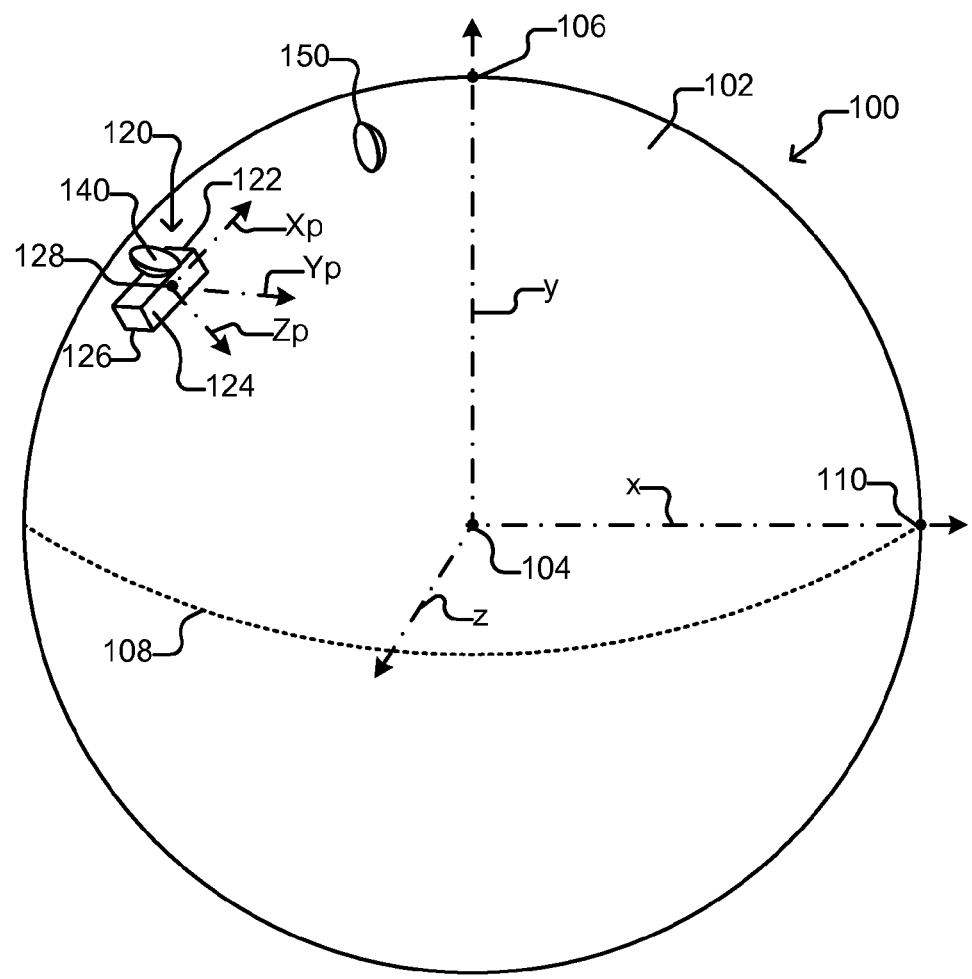
FIG. 1 depicts the earth with a target and a platform to which an antenna is mounted.

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. When used with regard to an angular parameter or direction, "substantially" means within plus or minus five degrees of the stated parameter or direction. The term "ones" means more than one.

A "directional antenna" is an antenna that radiates greater power in the direction of the antenna's bore sight than in other directions. The "bore sight" of an antenna is the axis of maximum gain of radiated power of the antenna. "Pointing" an antenna at a target means moving the bore sight of the antenna to be directed at the target. "Pointing" a dish, horn, or other antenna with a fixed bore sight can involve physically moving (e.g., rotating) the antenna. "Pointing" a phased array antenna, however, need not involve physically moving the antenna but can involve changing relative phases of radio frequency (RF) waves emitted by elements of the antenna to thereby move (e.g., rotate) the bore sight of the antenna. As used herein, "rotating" an antenna means rotating the bore sight of the antenna and includes physically rotating a fixed-bore-sight antenna (e.g., a dish antenna, horn antenna, or the like) and rotating the beam of a phased array antenna.

As used herein, the "phase center" of an antenna is the point from which electromagnetic radiation spreads spherically outward from the antenna. As used herein, the "orientation," "heading," "pitch," "roll," "coordinates," "location," and/or "offsets" of or with respect to a platform refer to the actual orientation, heading, pitch, roll, coordinates, location, and/or offsets of or with respect to the platform and/or the measured or determined orientation, heading, pitch, roll, coordinates, location, and/or offsets of or with respect to the platform, for example, as measured, determined, or provided by a device (e.g., a navigation device such as an inertial navigation system) attached to or otherwise a part of the platform. Thus, reference herein to the orientation, heading, pitch, roll, coordinates, location, and/or offsets of or with respect to a platform is broad and includes the orientation, heading, pitch, roll, coordinates, location, and/or offsets of or with respect to the platform as determined, measured, or provided by a navigation system (e.g., an inertial navigation system) attached or coupled to the platform.

As used herein, an "earth pointing vector" is abbreviated EPV and refers to a vector in an earth fixed coordinate frame from an antenna (e.g., the phase center of the antenna) on a platform to a target (e.g., the phase center of the target). A "relative pointing vector" is abbreviated RPV and refers to an EPV that has been rotated in accordance with the orientation of the platform (e.g., as provided by a navigation system attached to the platform) in the earth fixed coordinate frame and possible offsets of the antenna with respect to the platform. An "uncorrected relative pointing vector" is abbreviated uRPV and refers to an RPV in which the EPV has been rotated in accordance with the orientation of the platform and intentional offsets, if any, of the antenna with respect to the platform but not with respect to imperfection offsets of the antenna with respect to the platform.

A "corrected relative pointing vector" is abbreviated cRPV and refers to an RPV in which the EPV has been rotated in accordance with the orientation of the platform, any intentional offsets of the antenna with respect to the platform, and imperfection offsets of the antenna with respect to the platform. As used herein, "imperfection offsets" refer to unintended offsets between the antenna and the platform due to manufacturing imperfections or other imperfections in the platform, the antenna, or the like.

Figure 23:
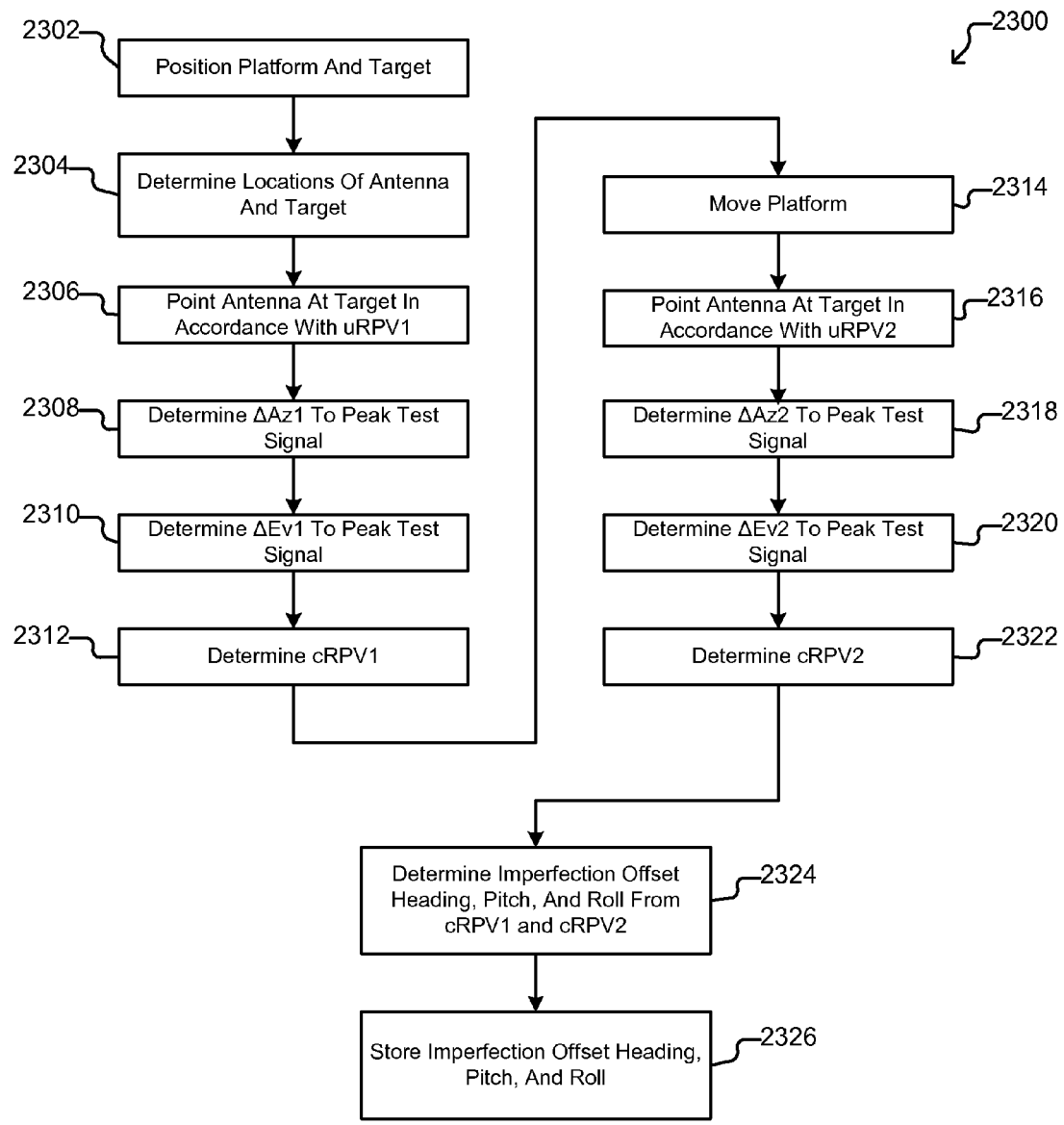
FIG. 23 illustrates an example of a process that utilizes one target to determine the imperfection offsets between an antenna and the platform to which the antenna is coupled.

Embodiments of the present invention are directed to processes that can align the bore sight of a radio frequency (RF) antenna with the platform to which the antenna is coupled by determining unknown imperfection offsets between the antenna and the platform. The unknown offsets can be due to such things as imperfections in the structures that couple the antenna to the platform. The processes can include determining two different relative pointing vectors that correspond to a detected peak strength of an RF test signal transmitted between one or more targets and the antenna. The processes can further include utilizing an optimization process to determine the heading, pitch, and roll of the imperfection offsets from the two different relative pointing vectors. FIGS. 6 and 23 illustrate examples of processes for determining imperfection offsets. Before turning to a discussion of those processes, a platform 120 to which an antenna 140 is coupled is discussed with respect to FIGS. 1-5C.

Figure 2:
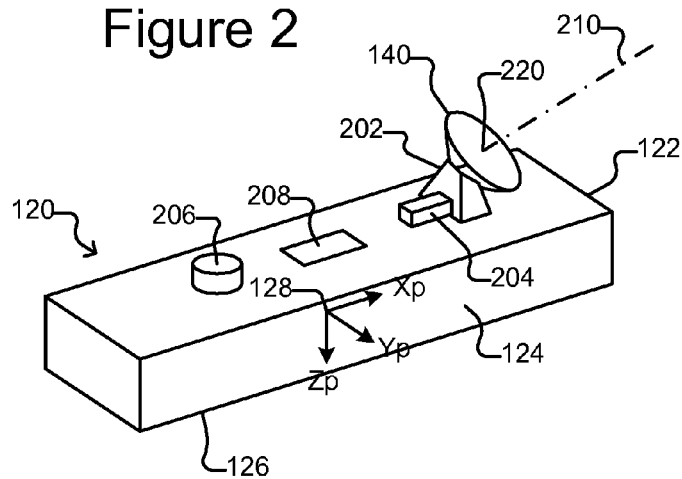
FIG. 2 illustrates a perspective view of the platform.
Figure 3:
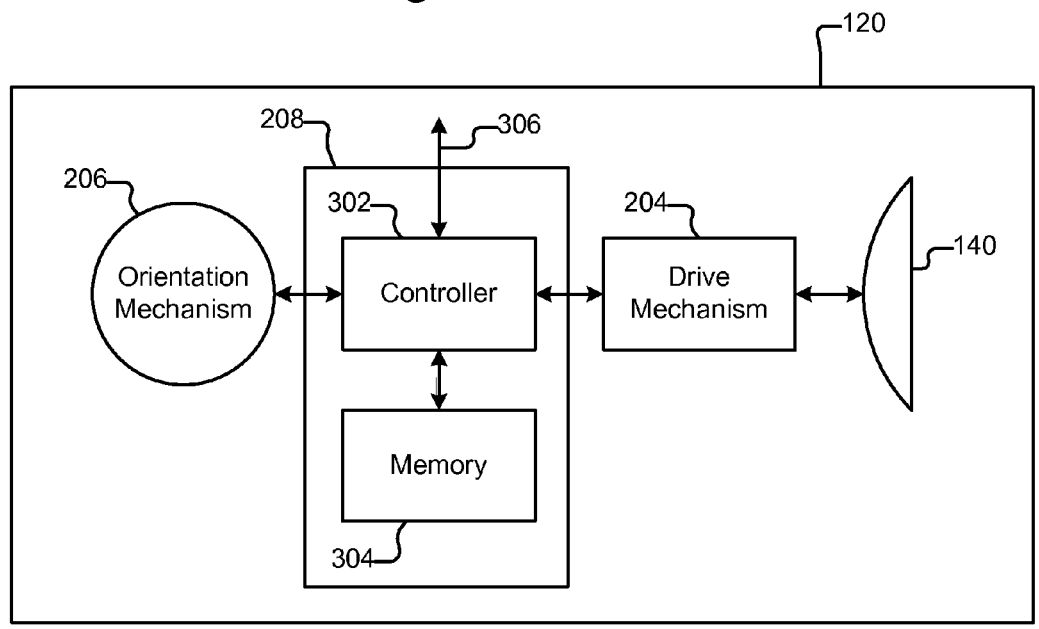
FIG. 3 is a block diagram of some elements of the platform.

FIGS. 1-3 illustrate a platform 120 comprising an RF antenna 140 whose bore sight 210 is to be aligned with the platform 120 and on which processes of the present invention can be performed. FIG. 1 shows the platform 120 in an earth fixed coordinate frame x, y, z; FIG. 2 illustrates the platform 120; and FIG. 3 illustrates a block diagram of some elements of the platform 120.

FIG. 1 shows the platform 120 disposed on or above the surface 102 of the earth 100. The platform 120 can be any platform to which an RF antenna 140 is coupled. For example, the platform 120 can be a mobile platform. Thus, the platform 120 can be an aircraft (e.g., an airplane, helicopter, or the like), a water vessel (e.g., an ocean going ship), a land vehicle (e.g., an automobile, truck, tank, or the like), a spacecraft (e.g., a space vehicle, satellite, or the like), or the like. Alternatively, the platform 102 can be a stationary platform. For example, the platform 102 can be anchored to the earth 100. Regardless, the bore sight 210 of the antenna 140 can be moveable on the platform 120 so that the antenna 140 can be pointed at a target 150, which can be, for example, another RF antenna. The target 150 can be fixed to the surface 102 of the earth or to a structure that is fixed to the surface 102 of the earth 100. Alternatively, the target 150 can be coupled to a mobile structure such as an aircraft, water vessel, land vehicle, space craft, or the like.

For ease of illustration and discussion but not by way of limitation, the following coordinate frames illustrated in FIG. 1 are used herein: an earth fixed coordinate frame consisting of x, y, and z orthogonal axes, and a platform 120 local level coordinate frame consisting of $X_p$, $Y_p$, and 4 orthogonal axes. The axes x, y, and z of the earth fixed coordinate frame, shown in FIG. 1, correspond to the earth as follows: the y axis is from the center 104 of the earth through the north pole 106; the x axis is from the center 104 of the earth through 0° east longitude at 0° latitude (labeled 110 in FIG. 1), and the z axis is from the center 104 of the earth and is orthogonal to the y and z axes, pointing outward from the center 106 of the earth towards the observer of FIG. 1. (The equator is labeled 108 in FIG. 1.) The platform 120 can then be defined in a local level coordinate frame as follows: the $X_p$ axis is from a central location 128 on (e.g., the center of mass of) the platform 120 to a point that represents forward on the platform 120; the $Y_p$ axis is a vector from the central location 128 out the right side 124 of the platform 120; and the $Z_p$ axis is from the central location 128 down (e.g., through the bottom 126 of the platform 120) in the platform coordinate system. As used herein for ease of illustration and discussion but not by way of limitation, the heading, pitch, and roll of the platform 120 are defined as follows: heading is the angle $\alpha$ of rotation about the $Z_p$ axis of the platform 120; pitch is the angle $\beta$ of rotation about the $Y_p$ axis; and roll is the angle $\gamma$ of rotation about the $X_p$ axis.

As shown in FIG. 2, the platform 120 includes an antenna 140 and such elements as a mounting structure 202, a drive mechanism 204, an orientation mechanism 206, and/or a controller 208.

The antenna 140 can be a directional RF antenna. For example, the antenna 140 can be a reflector antenna (e.g., a dish antenna), a horn antenna, a slot or aperture antenna, a phased array antenna, or the like. The bore sight 210 of the antenna 140 can be moveable on the platform 120 and can thus be pointed at targets (e.g., like target 150). For example, if a reflector antenna, horn antenna, slot or aperture antenna, or the like, the antenna 140 can be moveable with respect to the platform 120. If a phased array antenna or the like, the beam of the antenna 140 can be moveable with respect to the platform 120. Element 220 in FIG. 2 identifies the phase center of the antenna 140.

The mounting structure 202 can be any structure or structures for coupling the antenna 140 to the platform 120. For example, the mounting structure 202 can comprise a frame, bolts, clamps, and/or the like. The drive mechanism 204 can comprise one or more motors for moving and/or rotating the antenna 140 on the platform 120. For example, the drive mechanism 204 can comprise one or more stepping motors. Alternatively, the drive mechanism 204 can comprise mechanisms for steering the beam of a phased array antenna.

The orientation mechanism 206 can provide the orientation of the platform 120 in the earth fixed coordinate frame. That is, the orientation mechanism 206 can provide the heading, pitch, and roll of the platform 120 as discussed above. For example, the orientation mechanism 206 can comprise an inertial navigation system comprising gyroscopes, accelerometers, and/or the like that provide the instantaneous heading, pitch, and roll of the platform 120 within the earth fixed coordinate frame. As another example, the orientation mechanism 206 can comprise a global positioning system (GPS) and inertial momentum (IMU) device, which can be coupled to the GPS as a slave device, that can instantaneously determine the heading, pitch, and roll of the platform 120 from GPS satellites. Regardless, the orientation of the platform 120 can thus be the orientation of the orientation mechanism 206. That is, the heading $\alpha$, pitch $\rho$, and roll $\gamma$ of the platform 120 can be the heading, pitch, and roll of the orientation mechanism 206 attached to the platform 120. As yet another alternative, the platform 120 need not have an orientation mechanism 206, for example, if the platform 120 is a stationary platform. In such a case, the orientation (heading, pitch, and roll) of the platform 120 can be known or can be stored in an electronic memory on the platform 120.

As shown in FIG. 3, the control system 208 can comprise a controller 302 and a memory 304, which can store non-transitory signals and is thus referred to herein as a non-transitory memory. The controller 302 can comprise a digital electronic controller such as one or more microprocessors, computers, or the like. The memory 304 can comprise a digital electronic memory such as one or more semiconductor, magnetic, optical, or the like based digital memory devices. The controller 302 can operate in accordance with programmed digital instructions (e.g., software, firmware, microcode, or the like) stored in the memory 304 as non-transitory signals. Alternatively, the controller 302 can comprise hardwired digital logical circuits and operate under control of such hardwired circuits. As yet another alternative, the controller 302 can operate in accordance with both programmed digital instructions stored in the memory 304 and hardwired circuits.

As shown, the controller 302 can be connected to the orientation mechanism 206 and the drive mechanism 204. The controller 302 can also include one or more input/output ports 306 through which such things as control signals and/or data can be input to and/or output from the controller 302. The controller 302 can, for example, provide control signals to the drive mechanism 204 that cause the drive mechanism to move (e.g., rotate) the antenna 140 to a particular orientation with respect to the orientation of the platform 120, which can be received from the orientation mechanism 206. Anywhere herein that movement or rotation of the antenna 140 is mentioned, such movement or rotation can be accomplished by the controller 302 providing control signals to the drive mechanism 204, which moves or rotates the antenna 140 accordingly.

Figure 4:
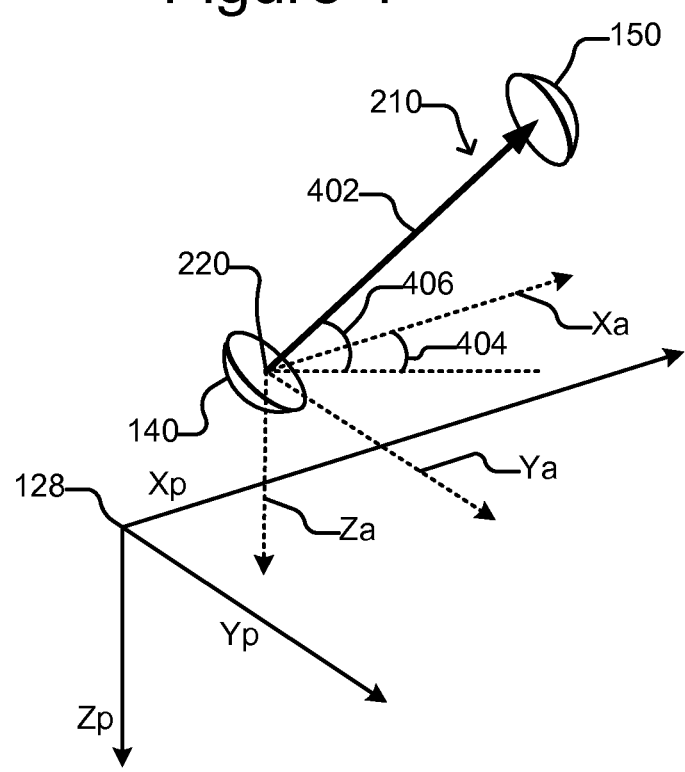
FIG. 4 illustrates pointing the antenna at the target in accordance with a relative pointing vector.

As illustrated in FIG. 4, the orientation of the antenna 140 with respect to the platform 120 can be defined in terms of an azimuth angle 404 and an elevation angle 406. Defined in terms of three orthogonal axes $X_a$, $Y_a$, and $Z_a$ that originate at the phase center 220 of the antenna 140 and are substantially parallel, respectively, to the $X_p$, $Y_p$, and $Z_p$ axes of the platform, the azimuth plane is the $X_a$, $Y_a$ plane, and the azimuth angle 404 is an angle in the azimuth plane $X_a$, $Y_a$ from the $X_a$ axis (where clock wise rotation is positive). The elevation angle 406 is an angle from the azimuth plane $X_a$, $Y_a$ toward the $Z_a$ axis (where rotation toward the negative portion of the $Z_a$ axis is positive, which corresponds to "nose up" if the platform 120 is an aircraft).

As illustrated in FIG. 4, in use, the antenna 140 can be pointed at a target 150 by rotating, with respect to the platform 120, the antenna 140 through an azimuth angle 404 and an elevation angle 406 defined by a relative pointing vector RPV 402. As noted above, rotating an antenna 140 means rotating the bore sight 210 of the antenna 140. As also noted above, an RPV 402 is derived from an earth pointing vector EPV from the antenna 140 to the target 150 in the earth fixed coordinate frame by rotating the EPV through the orientation of the platform 120 in the earth fixed coordinate system and any known offsets of the antenna 140 with respect to the platform 120. The RPV 402, like any vector, can be expressed in terms of Cartesian coordinates (x, y, z coordinates) or in terms of polar coordinates, which consist of range, an azimuth angle, and an elevation angle. Mathematical formulas for converting between Cartesian coordinates and polar coordinates are well known. The azimuth angle 404 and the elevation angle 406 in FIG. 4 can be the azimuth angle and elevation angle of the RPV expressed in polar coordinates. The azimuth angle 404 and the elevation angle 406 can thus be obtained from the RPV, and the control system 208 can cause the drive mechanism 206 to rotate the antenna 140 through the azimuth angle 404 and the elevation angle 406 to thereby point the antenna 140 (or more precisely the bore sight 210 of the antenna 140) at the target 150 as shown in FIG. 4.

Figure 5A:
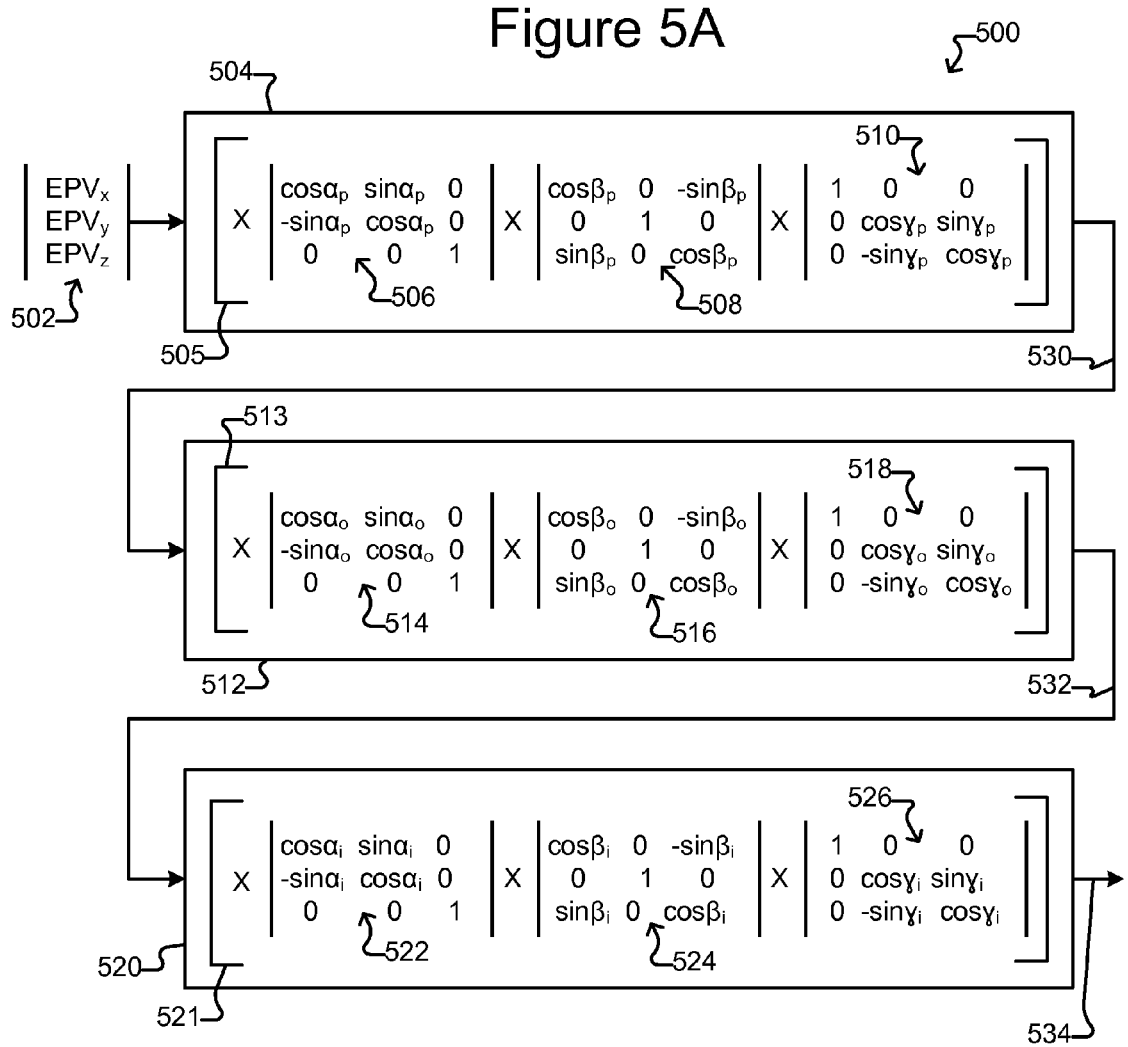
FIG. 5A illustrates a process for obtaining the relative pointing vector from an earth pointing vector in earth fixed coordinates from the platform to the target.
Figure 5B:
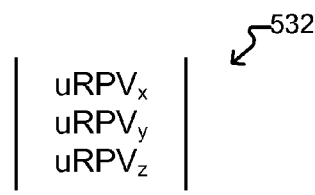
FIG. 5B illustrates an uncorrected relative pointing vector.
Figure 5C:
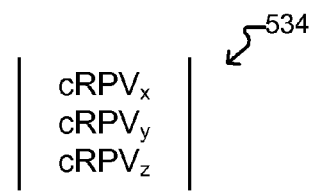
FIG. 5C shows a corrected relative pointing vector.
Figure 6:
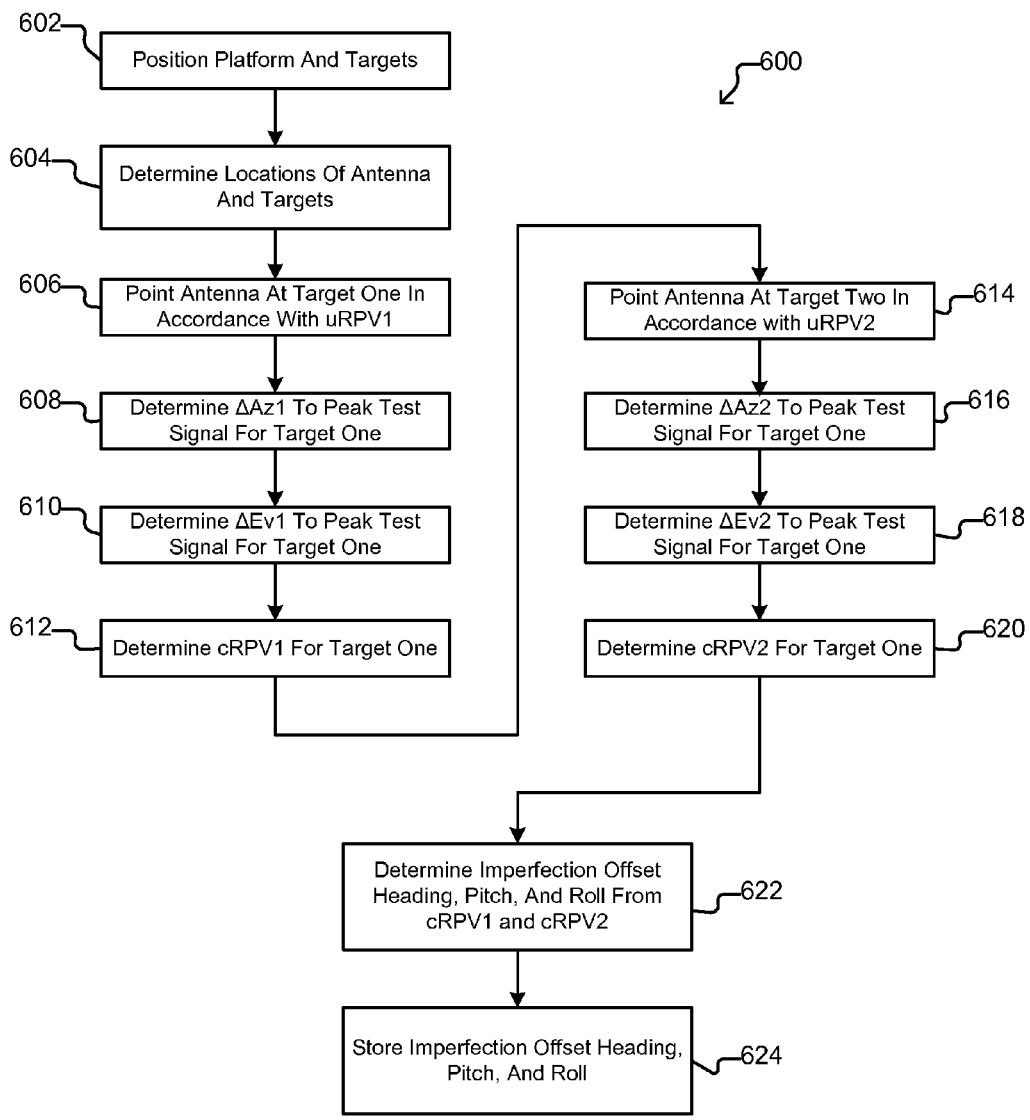
FIG. 6 illustrates an example of a process that utilizes multiple targets to determine the imperfection offsets between an antenna and the platform to which the antenna is coupled.

FIG. 5A illustrates an example of a process 500 that can be used to obtain the RPV 402 from an earth pointing vector EPV from the antenna 140 to the target 150. FIGS. 5A-5C also illustrate a problem that can be solved by embodiments of the invention.

As shown in FIG. 5A, the process 500 can begin with the EPV 502 from the antenna 140 to the target 150. Although the EPV 502 can be in any suitable vector format, in FIG. 5A, the EPV 502 is shown as consisting of $EPV_x$, $EPV_y$, and $EPV_z$, which are x, y, and z coordinates of the EPV 502 in the earth fixed coordinate frame. As will generally be discussed below with respect to FIG. 10, the EPV can be obtained from the locations of the antenna 140 and the target 150 in the earth fixed coordinate frame.

As shown in FIG. 5A, at step 504, the process 500 can rotate the EPV 502 through the orientation of the platform 120, which as noted above, consists of the heading, pitch, and roll of the platform 120 in the earth fixed coordinate frame. Herein, $\alpha_p$ refers to the heading angle of the platform 120, $\beta_p$ refers to the pitch angle of the platform 120, and $\gamma_p$ refers to the roll angle of the platform 120. As noted above, the orientation of the platform 120 can be provided by the orientation mechanism 206, and the heading angle $\alpha_p$ of the platform 120 can thus be the heading angle of the orientation mechanism 206, the pitch angle $\beta_p$ of the platform 120 can be the pitch angle of the orientation mechanism 206, and the roll angle $\gamma_p$ of the platform can be the roll angle of the orientation mechanism 206. Thus, the term the "orientation of the platform 120" is used herein broadly to include the orientation of the orientation mechanism 206. Likewise, the term the "heading angle $\alpha_p$ of the platform 120" is used herein broadly to include the heading angle of the orientation mechanism 206, the term the "pitch angle $\beta_p$ of the platform 120" is used herein broadly to include the pitch angle of the orientation mechanism 206, and the term the "roll angle $\gamma_p$ of the platform 120" is used herein broadly to include the roll angle of the orientation mechanism 206.

As shown in FIG. 5A, the process 500 can start with the EPV 502 and rotate the EPV 502 through the heading angle $\alpha_p$, the pitch angle $\beta_p$, and the roll angle $\gamma_p$ of the platform 120, for example, as provided by the orientation mechanism 206. As also illustrated in FIG. 5A, the foregoing can be accomplished by processing the EPV 502 in accordance with a platform orientation matrix 505 that comprises a heading rotation matrix 506, a pitch rotation matrix 508, and a roll rotation matrix 510 corresponding to the platform orientation. The EPV 502 can thus be rotated through the orientation of the platform 120 by vector multiplication operations in which the EPV 502 is multiplied by the heading rotation matrix 506, the resulting vector product is then multiplied by the pitch rotation matrix 508, and that vector product is then multiplied by the roll rotation matrix 510. That is, the step 504 in FIG. 5A rotates the EPV 502 through the heading angle $\alpha_p$ of the platform 120, the pitch angle $\beta_p$ of the platform 120, and the roll angle $\gamma_p$ of the platform 120 in the foregoing order.

The result 530 of step 504 is thus the EPV 502 rotated through the orientation of the platform 120. That result 530 can be further rotated at step 512 through the intentional orientation offsets, if any, of the antenna 140 with respect to the platform 120. That is, in some instances, the antenna 140 is mounted to the platform 120 with intentional offsets between the antenna 140 and the platform 120. Such intentional offsets can include heading, pitch, and roll components. Herein, $\alpha_o$ refers to the heading angle of the intentional offsets, $\beta_o$ refers to the pitch angle of the intentional offsets, and $\gamma_o$ refers to the roll angle of the intentional offsets. The heading, pitch, and roll of the intentional offsets can be known, for example, from the physical specifications of the platform 120 and/or antenna 140.

As shown in FIG. 5A, step 512 can be accomplished by processing the result 530 of step 504 in accordance with an offsets orientation matrix 513 that comprises a heading rotation matrix 514, a pitch rotation matrix 516, and a roll rotation matrix 518 corresponding to the offsets orientation. The results 530 of step 504 can thus be rotated through the offsets orientation by vector multiplication operations in which the result 530 of step 504 is multiplied by the heading rotation matrix 514, the resulting vector product is then multiplied by the pitch rotation matrix 516, and that vector product is then multiplied by the roll rotation matrix 518. That is, the step 512 in FIG. 5A rotates the result 530 through the heading angle $\alpha_o$ of the intentional offsets, the pitch angle $\beta_o$ of the intentional offsets, and the roll angle $\gamma_o$ of the intentional offsets in the foregoing order.

The result 532 of step 512 is the uncorrected relative pointing vector uRPV 532, which as shown in FIG. 5B, can be expressed in Cartesian coordinates x, y, and z values $uRPV_x$, $uRPV_y$, and $uRPV_z$. The uRPV 532 can be used as the RPV 402 of FIG. 4 to point the antenna 140 at the target 150 as discussed above with respect to FIG. 4. As discussed above, the uRPV 532 accounts for the orientation of the platform 120 in the earth fixed coordinate frame (at step 504 of FIG. 5A) and the intentional offsets between the platform 120 and the antenna 140 (at step 512). The uRPV 532 does not, however, account for the difference between the orientation of the antenna 140 and the orientation of the platform 120 due to unintentional offsets between the antenna 140 and the platform 120 due to such things as imperfections in the platform 120, the antenna 140, the antenna mounting structure 202, or the like. Such imperfections can include manufacturing imperfections or the like. As previously noted, the difference between the orientations of the platform 120 and the antenna 140 due to such imperfections are referred to herein as the "imperfection offsets," which can also be expressed in terms of a heading, pitch, and roll. Herein, $\alpha_i$ refers to the heading angle of the imperfection offsets, $\beta_i$ refers to the pitch angle of the imperfection offsets, and $\gamma_i$ refers to the roll angle of the imperfection offsets.

If the uRPV 532 is used as the RPV 402 in FIG. 4, the bore sight 210 of the antenna 140 will not point directly at the target 150 but will be offset from the target 150 by the imperfection offsets. The imperfection offsets, however, can be accounted for by step 520 of the process 500 of FIG. 5A.

As shown in FIG. 5A, step 520 can be accomplished by processing the uRPV 532, which is the result of step 512, in accordance with an imperfections orientation matrix 521 that comprises a heading rotation matrix 522, a pitch rotation matrix 524, and a roll rotation matrix 526 corresponding to the imperfections orientation. The uRPV 532 can thus be rotated through the imperfections orientation by vector multiplication operations in which the uRPV 532 that is the result of step 512 is multiplied by the heading rotation matrix 522, the resulting vector product is then multiplied by the pitch rotation matrix 524, and that vector product is then multiplied by the roll rotation matrix 526. That is, the step 520 in FIG. 5A rotates the uRPV 532 through the heading angle $\alpha_i$ of the imperfections offsets, the pitch angle $\beta_i$ of the imperfections offsets, and the roll angle $\gamma_i$ of the imperfections offsets in the foregoing order.

As shown in FIG. 5A, the result of step 520 can be the corrected relative pointing vector cRPV 534, which as shown in FIG. 5C, can be expressed in Cartesian coordinates as x, y, and z values $cRPV_x$, $cRPV_y$, and $cRPV_z$. Unlike the uRPV 532, the cRPV 534 accounts for the imperfection offsets between the platform 120 and the antenna 140 (step 520 of Figure). Thus, if the cRPV 534 is used as the RPV 402 in FIG. 4, the bore sight 210 of the antenna 140 will point substantially directly at the target 150. It thus may be preferable to use the cRPV 534 rather than the uRPV 532 as the RPV 402 in FIG. 4, which as discussed above, depicts normal use of the antenna 140 to communicate with a target 150.

The imperfection offsets, however, are not typically known and can be difficult to determine. As noted above, embodiments of the invention include processes for efficiently determining the imperfection offsets. FIG. 6 illustrates a first example of a process 600 for determining the imperfection offsets, and FIG. 23 illustrates a second example of such a process 2300. As noted, the imperfection offsets can be expressed as an imperfection heading angle imperfection pitch angle $\beta_i$, and imperfection roll angle $\gamma_i$. The processes 600 and 2300 illustrated in FIGS. 6 and 23 can thus determine the imperfection heading angle imperfection pitch angle $\beta_i$, and imperfection roll angle $\gamma_i$ that can be used, for example, at step 520 of FIG. 5A.

Before turning to a description of processes 600 and 2300, it is noted that those processes can be performed entirely manually by a human user. Alternatively, the processes 600 and 2300 can be embodied as machine instructions (e.g., software, firmware, or the like) stored in the memory 304 (see FIG. 3) that can be executed by the controller 302 to perform the processes 600 or 2300. As noted above, the memory 304 can be a non-transitory memory, and the machine instructions can be stored as non-transitory signals in the memory 304. As yet another alternative, the processes 600 and 2300 can be performed in part manually by a human user and can be embodied in part as the machine instructions in the memory 304 as discussed above.

Figure 7:
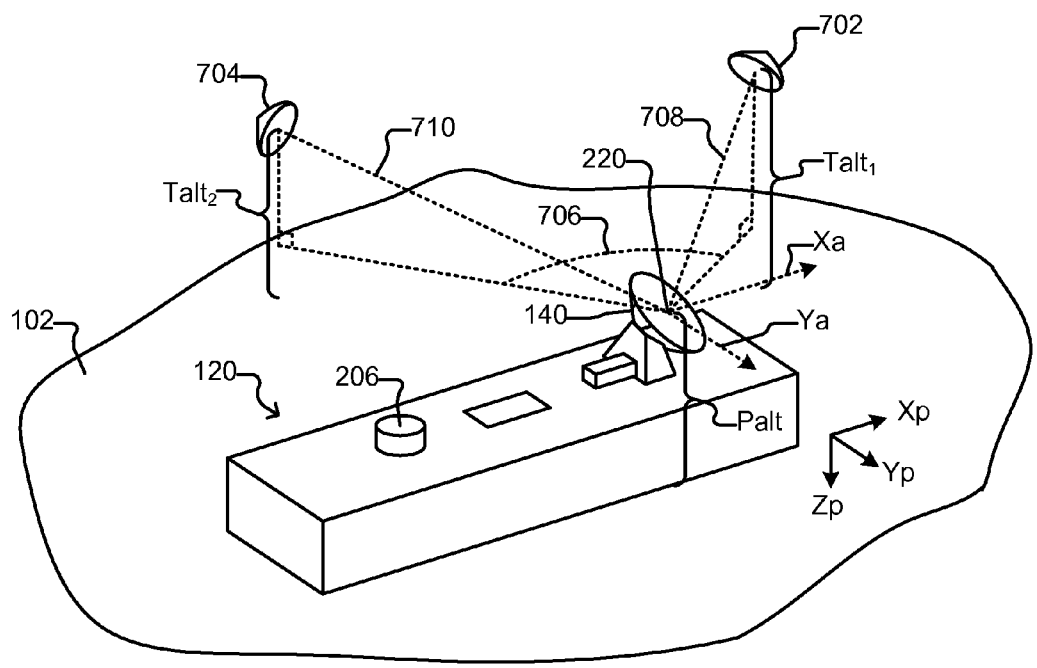
FIG. 7 illustrates an example of positioning the platform and multiple targets.

Turning first to FIG. 6, at step 602, the process 600 can position the platform 120 and two targets 702 and 704 (see FIG. 7), which can be RF antennas, such that the targets can transmit test signals to and/or receive test signals from the antenna 140. FIG. 7 illustrates an example.

As illustrated in FIG. 7, the platform 120 can be placed in a stationary position with respect to the surface 102 of the earth 100. For example, if the platform 120 is an aircraft, land vehicle, or spacecraft, the platform 120 can be parked on the surface 102 of the earth 100. As another example, if the platform 120 is a water vessel, the platform 120 can be in water (which is part of the surface 102 of the earth 100) and can be moored to a dock or otherwise secured in a generally stationary position on the water.

The targets 702 and 704 can be placed in stationary positions with respect to the platform 120. In addition, each target 702 and 704 can be placed in an RF signal path 708 and 710 with the antenna 140. The signal paths 708 and 710 can be direct line of sight (LOS) paths.

The targets 702 and 704 can also be placed such that the angle 706 in the azimuth plane $X_a, Y_a$ (as defined above with respect to FIG. 4) between the signal path 708 from the antenna 140 to the first target 702 projected onto the azimuth plane and the signal path 710 from the antenna 140 to the second target 704 projected onto the azimuth plane is between sixty degrees (60°) and one-hundred twenty degrees (120°) inclusive.

The targets 702 and 704 can be secured in any manner that places the targets 702 and 704 in stationary positions meeting the foregoing criteria. For example, one or both of the targets 702 and 704 can be attached to structures (e.g., towers, buildings, or the like) that extend from the surface 102 of the earth 100. As another example, one or both of the targets 702 and 704 can be disposed on a geographical feature of the earth such as a side or top of a hill or mountain. As another example, one or both of the targets 702 and 704 can be attached to parts of the platform 120. For example, if the platform 120 is a water vessel, the targets 702 and 704 can be attached to structures of the water vessel such as masts or the like.

Returning to FIG. 6, at step 604, the process 600 can determine the locations of the antenna 140 and the targets 702 and 704 in the earth fixed coordinate frame. For example, the locations of each of the antenna 140, the first target 702, and the second target 704 can be determined in terms of the altitude, longitude, and latitude of the phase center 220 of the antenna 140 and the phase centers of each of the targets 702 and 704. These locations can be determined in any manner for determining altitude, longitude, and latitude. For example, global positioning devices (e.g., satellites and hand held devices) can be used to determine the longitude, latitude, and altitude of the phase centers of the antenna 140, the first target 702, and the second target 704. Hereinafter, the locations of the phase centers of the antenna 140, the first target 702, and the second target 704 are referred to simply as the locations of the antenna 140, the first target 702, and the second target 704. The following abbreviations are used herein to refer to the locations of the antenna 140, the first target 702, and the second target 704 determined at step 604:

TABLE 1

| Location | Abbreviation |
| --- | --- |
| altitude of antenna 140 | Palt |
| longitude of antenna 140 | Plon |
| latitude of antenna 140 | Plat |
| altitude of first target 702 | $Talt_1$ |
| longitude of first target 702 | $Tlon_1$ |
| latitude of first target 702 | $Tlat_1$ |
| altitude of second target 704 | $Talt_2$ |
| longitude of second target 704 | $Tlon_2$ |
| latitude of second target 704 | $Tlat_2$ |

Figure 8:
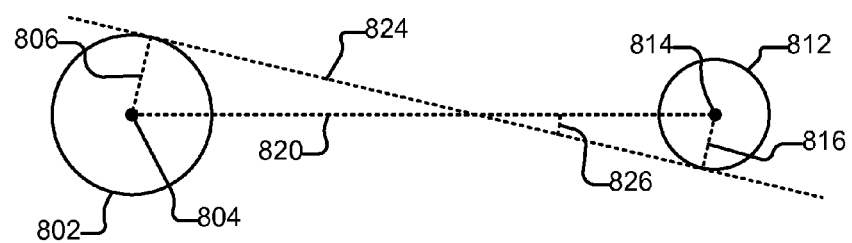
FIG. 8 illustrates an example of a relationship between the accuracy of the locations of the platform and the targets and the pointing accuracy of the antenna.

FIG. 8 illustrates an example of how uncertainty in the locations of the platform 120 and the targets 702 and 704 can affect the pointing accuracy of the antenna 140. In FIG. 8, location 804 is the location of the antenna 140 as measured at step 604 of FIG. 6, and the circle 802 represents the range of possible actual locations of the antenna 140. The maximum uncertainty 806 in the measured location of the antenna 140 is thus the radius $U_P$ 806 of the circle 802. Location 814 similarly is the location of the target 702 or 704 as measured at step 604, and the circle 812 represents the range of possible actual locations of a target 702 or 704. The maximum uncertainty 816 in the measured location of a target 702 or 704 is thus the radius $U_T$ 816 of the circle 812. The slant range SR 820 is the distance between the points 804 and 814, and the angle Θ 826 is the angle between the SR 820 and a line 824 that crosses the SR 820 and is tangent to both circles 802 and 812 as shown. The pointing accuracy of the antenna 140 can correspond to the angle Θ 826, which relates to the parameters in FIG. 8 as follows: $\sin(\Theta) = (U_P + U_T)/(SR \times \sin(\text{angle}_T))$, wherein sin means the trigonometric mathematical operation/means mathematical division, x refers to mathematical multiplication, and $\text{angle}_T$ refers to the angle 706 in the azimuth plane $X_a$, $Y_a$ between the targets 702 and 704, which is illustrated in FIG. 7 and discussed above.

Figure 9:
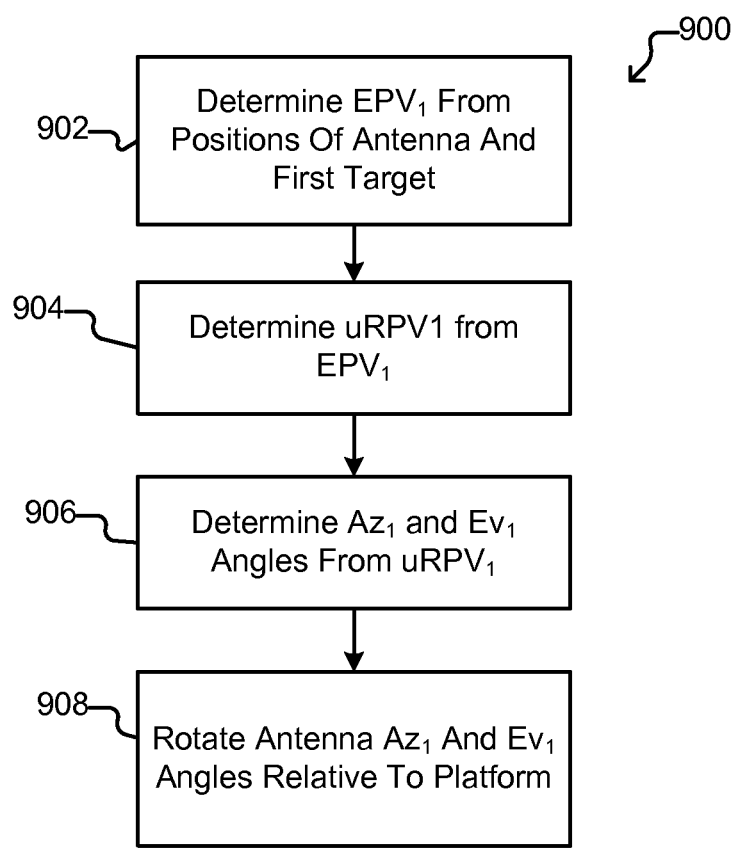
FIG. 9 shows an example of a process for pointing the antenna at the first target in accordance with an uncorrected relative pointing vector.

Referring again to FIG. 6, at step 606, the process 600 can point the antenna 140 at the first target 702 without taking into consideration the imperfection offsets, which as discussed above, are not known. FIG. 9 illustrates an example of a process 900 that can be used to point the antenna 140 at the first target. The process 900 of FIG. 9 can thus perform the step 606 of FIG. 6.

Figure 10:
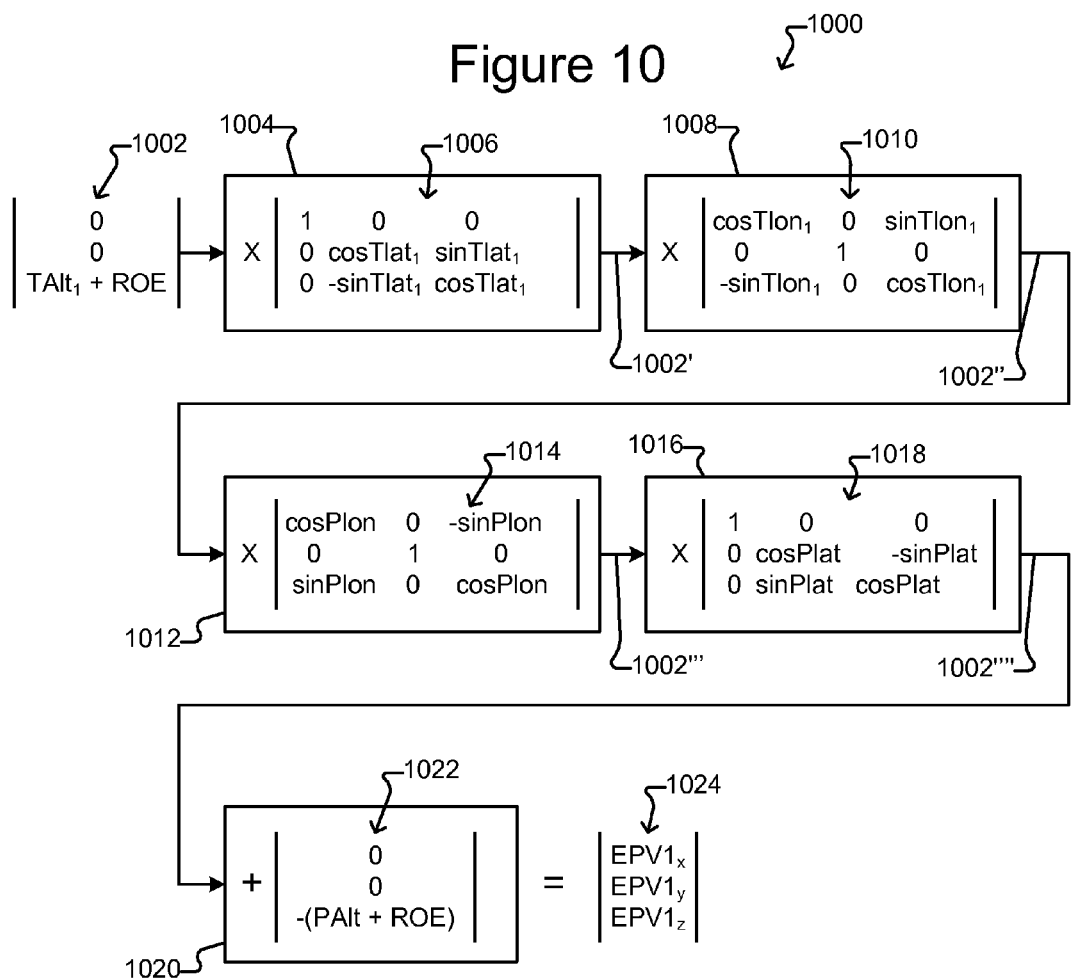
FIG. 10 illustrates an example of a process for determining the earth pointing vector from the platform to the target from the locations of the platform and the target.

Referring now to FIG. 9, the process 900 can determine at step 902 the EPV1 (equivalent to 502 in FIG. 5A) from the antenna 140 to the first target 702. This can be accomplished using the positions of the antenna 140 and the first target 702 as determined at step 604 of FIG. 6. FIG. 10 illustrates an example of a process 1000 for performing the step 902 of FIG. 9. In the process 1000, a spherical model of the earth is used. In other examples, other earth models can be used such as the WGS84 model of the earth.

With reference to FIG. 10, the process 1000 can start with a vector 1002 in x, y, z format in which the x and y coordinates are zero and the z coordinate is the sum of the radius of the earth and the altitude $\text{Talt}_1$ of the first target 702 (see FIG. 7 and Table 1 above). At step 1004, the process 1000 can rotate the vector 1002 from the latitude $\text{Tlat}_1$ of the first target 702 to the equator 108 (see FIG. 1) to produce the vector 1002'. As shown in FIG. 10, this can be accomplished by multiplying the vector 1002 by the rotation matrix 1006, wherein $\text{Tlat}_1$ is the angular latitude of the first target 702. (See Table 1 above.) At step 1008, the process 1000 can rotate the vector 1002' from the longitude $\text{Tlon}_1$ of the first target 702 to zero degrees east longitude 110 (see FIG. 1) to produce the vector 1002''. As shown in FIG. 10, this can be accomplished by multiplying the result 1002' of step 1004 by the rotation matrix 1010, wherein $\text{Tlon}_1$ is the angular longitude of the first target 702. (See Table 1 above.)

At step 1012, the process 1000 can rotate the vector 1002'' from zero degrees east longitude 110 (see FIG. 1) to the longitude Plon of the antenna 140 to produce the vector 1002'''. As shown in FIG. 10, this can be accomplished by multiplying the result 1002'' of step 1008 by the rotation matrix 1014, where Plon is the angular longitude of the antenna 140. (See Table 1 above.) At step 1016, the process 1000 can rotate the vector 1002''' from the longitude Plon of the antenna 140 to the latitude Plat of the antenna 140 to produce the vector 1002'''. As shown in FIG. 10, this can be accomplished by multiplying the result 1002''' of step 1012 by the rotation matrix 1018, where Plat is the angular latitude of the antenna 140. (See Table 1 above.)

At step 1020, the process 1000 can adjust the result 1002''' of step 1016 by the altitude PAlt of the antenna 140. (See Table 1 above.) As shown in FIG. 10, this can be accomplished by adding the result 1002''' of step 1016 to a vector 1022 in x, y, z format in which the x and y coordinates are zero and the z coordinate is the sum of the radius of the earth and the altitude Palt of the antenna 140 (see FIG. 7 and Table 1 above). As shown, the result can be the EPV1 1024 from the antenna 140 to the first target 702. Generally as discussed above, the EPV1 1024 from the antenna 140 to the first target 702 can be expressed in Cartesian coordinates as x, y, and z values $\text{EPV1}_x$, $\text{EPV1}_y$, and $\text{EPV1}_z$. Note that the EPV1 is equivalent to the EPV 502 in FIG. 5A.

Returning to FIG. 9, after determining the EPV1 from the antenna 140 to the first target 702 at step 902 (e.g., by the process 1000 of FIG. 10), the process 900 can determine at step 904 the uRPV1 from the EPV1. The uRPV1 from the antenna 140 to the first target 702 is equivalent to the uRPV 532 of FIGS. 5A and 5B, and step 904 can thus be accomplished by starting the process 500 of FIG. 5A with the EPV in FIG. 5A as the EPV1 expressed as $\text{EPV1}_x$, $\text{EPV1}_y$, and $\text{EPV1}_z$. The steps 504 and 512 can then be performed on the EPV1. The resulting vector 532 will thus be the uRPV1 from the antenna 140 to the first target 702. Generally as discussed above, however, the uRPV1 does not account for the imperfection offsets.

Figure 11:
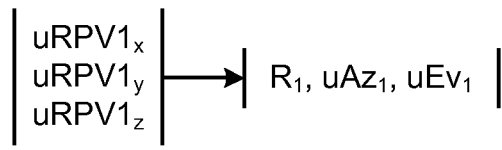
FIG. 11 illustrates determining azimuth and elevation angles from an uncorrected relative pointing vector.

Still referring to FIG. 9, at step 906, the process 900 can extract from the uRPV1 an azimuth angle $Az_1$ and an elevation angle $Ev_1$. As shown in FIG. 11, this can be accomplished by converting, using known mathematical conversions techniques, the uRPV1 from the x, y, z coordinates $\text{uRPV1}_x$, $\text{uRPV1}_y$, and $\text{uRPV1}_z$ to polar coordinates expressed as range $R_1$, azimuth angle $\text{uAz}_1$, and elevation angle $\text{uEv}_1$.

Figure 12:
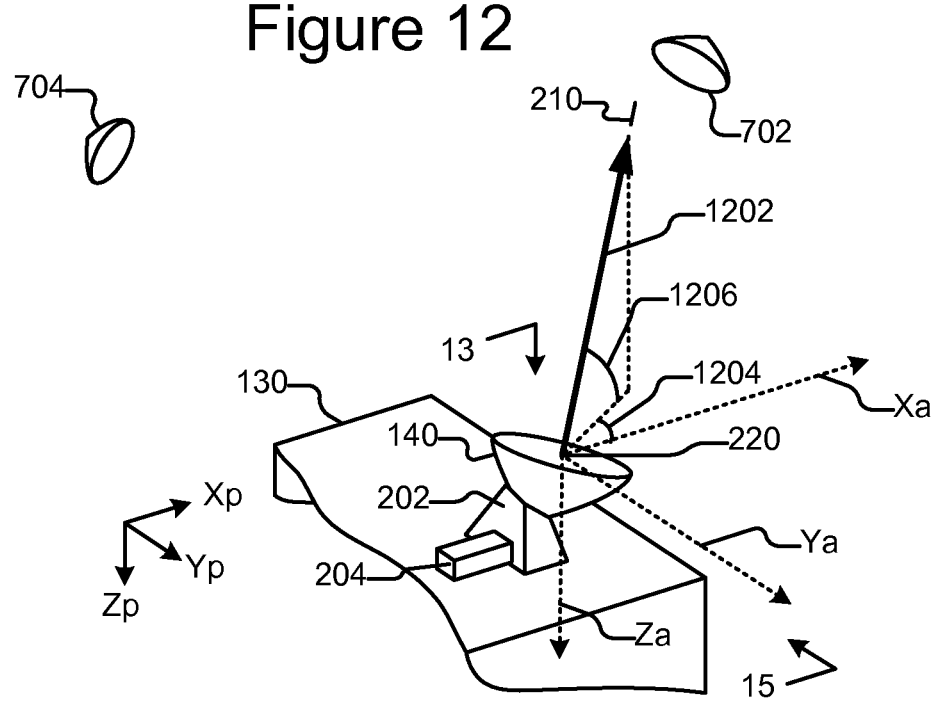
FIG. 12 illustrates an example of pointing the antenna at the first target.

At step 908 of FIG. 9, the process 900 can rotate the antenna 140 through the azimuth angle $\text{uAz}_1$ and elevation angle $\text{uEv}_1$ obtained from the uRPV1 at step 906. Generally consistent with the discussion of FIG. 4 above, this points the antenna 140 (that is the bore sight 210) at the first target 702. FIG. 12 illustrates an example in which the uRPV1 is labeled 1202, the azimuth angle $\text{uAz}_1$ is labeled 1204, and the elevation angle $\text{uEv}_1$ is labeled 1206. As noted above, however, the uRPV1 1202 does not account for the imperfection offsets. Consequently, the uRPV1 1202 does not cause the bore sight 210 of the antenna 140 to point directly at the target 702. Rather, the bore sight 210 is askew from the target 702 due to the imperfection offsets.

Figure 13:
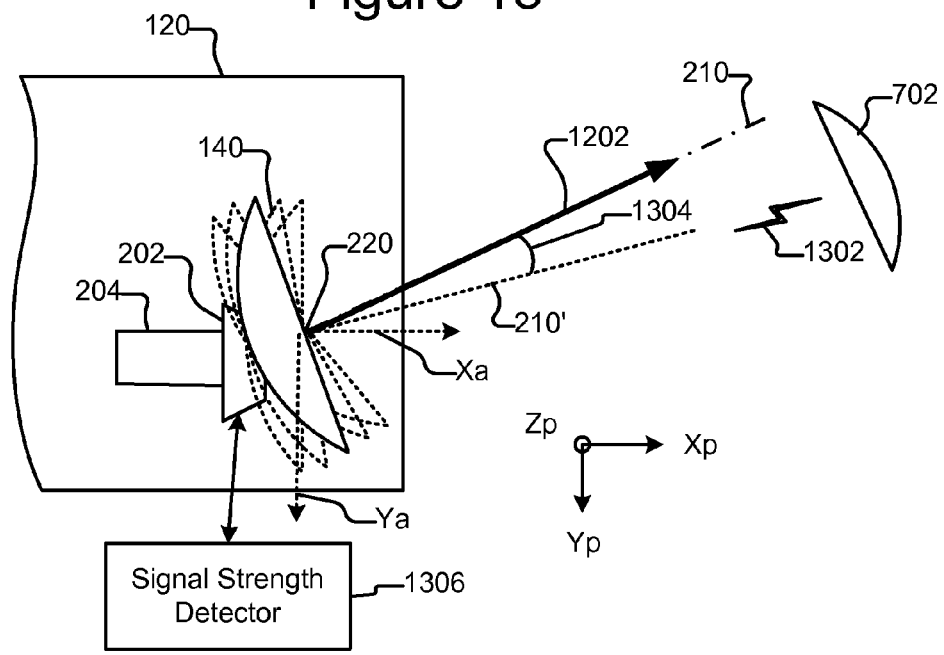
FIG. 13 illustrates moving the antenna in an azimuth plane through an angle that corresponds to a detected peak strength of a test signal transmitted between the first target and the antenna.
Figure 14:
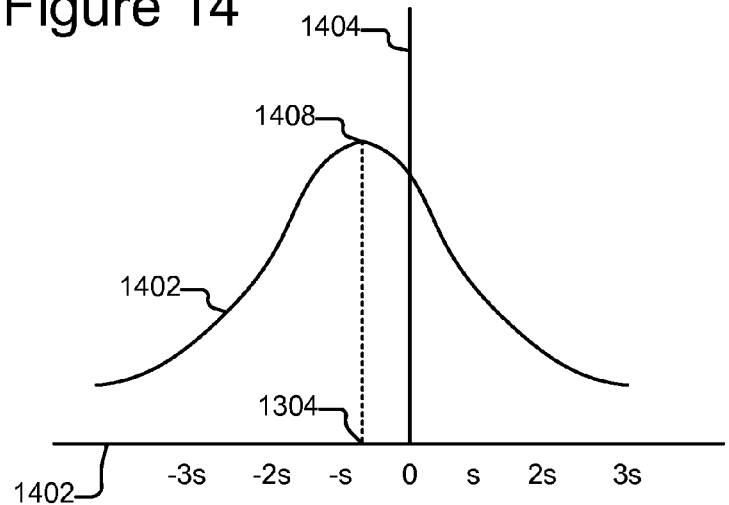
FIG. 14 is a graph of the strength of the test signal verses azimuth rotation of the antenna.

Returning to FIG. 6, after the process 600 points the antenna 140 at the first target 702 in accordance with the uRPV1 at step 606 (e.g., by performing the process 900 of FIG. 9), the process 600 determines at step 608 a delta azimuth angle $\Delta Az_1$ through which the antenna 140 is rotated from the uRPV1 1202 that corresponds to a peak detected signal strength of an RF test signal 1302 (see FIG. 13) transmitted between the first target 702 and the antenna 140. Although the test signal 1302 is discussed hereinafter as being transmitted by the first target 702 to the antenna 140, the test signal 1302 can instead be transmitted from the antenna 140 to the first target 702. FIGS. 13 and 14 illustrate an example in which the test signal 1302 is transmitted from the first target 702 to the antenna 140.

As shown in FIG. 13 (which shows a partial, top view of the platform 120), the antenna 140 can be rotated from the uRPV1 1202 in the azimuth plane $X_a$, $Y_a$ while receiving a test signal 1302 transmitted by the first target 702. The azimuth angle through which the antenna 140 (more specifically the bore sight 210) is rotated from the uRPV1 1202 to the peak strength of the test signal 1302 as detected at the antenna 140 is the delta azimuth angle $\Delta Az_1$ 1304. The strength of the test signal 1302 can be monitored in any way that test signal strengths are monitored. For example, the strength of the test signal 1302 at the antenna 140 can be monitored with a signal detector 1306 (e.g., a spectrum analyzer) as shown in FIG. 13. Alternatively, the strength of the test signal 1302 can be monitored in other ways. For example, the strength of the test signal 1302 can be a metric provided by a receiver (not shown) connected to the antenna 140 at the platform 120. Regardless, the strength of the test signal 1302 can be monitored by a human user and/or connected (e.g., through input/outputs 306) to the controller 302 (see FIG. 3).

The foregoing is further illustrated in FIG. 14, which shows a plot 1402 of the test signal 1302 at the antenna 140 while the antenna 140 is rotated in the azimuth plane. The horizontal axis 1402 represents rotation of the bore sight 210 of the antenna 140 in the azimuth plane $X_a, Y_a$ from the uRPV1 1202 in multiples of a step size s. Positive angles along the horizontal axis 1402 represent clockwise angular rotations (nose right if the platform 120 is an aircraft) from the uRPV1 in FIG. 13, and negative angles along the horizontal axis 1402 represent counterclockwise angular rotation from the uRPV1 1202 in FIG. 13. The vertical axis 1404 in FIG. 14 represents the strength of the test signal 1302 received at the antenna 140.

As shown, as the antenna 140 is rotated in the azimuth plane $X_a, Y_a$ in both positive and negative angular directions from the uRPV1 1202, the strength of the test signal 1302 at the antenna 140 varies. The delta azimuth angle $\Delta Az_1$ 1304 (see also FIG. 13) that corresponds to the detected peak strength 1408 of the test signal 1302 at the antenna 140 can thus be determined at step 608 of FIG. 6.

It is noted that the range of angles in the azimuth plane $X_a, Y_a$ over which the antenna 140 can be rotated at step 608 can be relatively large in some embodiments. For example, the antenna 140 can be rotated in the azimuth plane $X_a, Y_a$ at least twenty degrees in the positive direction and at least twenty degrees in the negative direction from the uRPV1 in some embodiments. The delta azimuth angle $\Delta Az_1$ 1304 determined at step 608 of FIG. 6 can thus be greater than five degrees, ten degrees, fifteen degrees, twenty degrees, or more in some embodiments.

Figure 15:
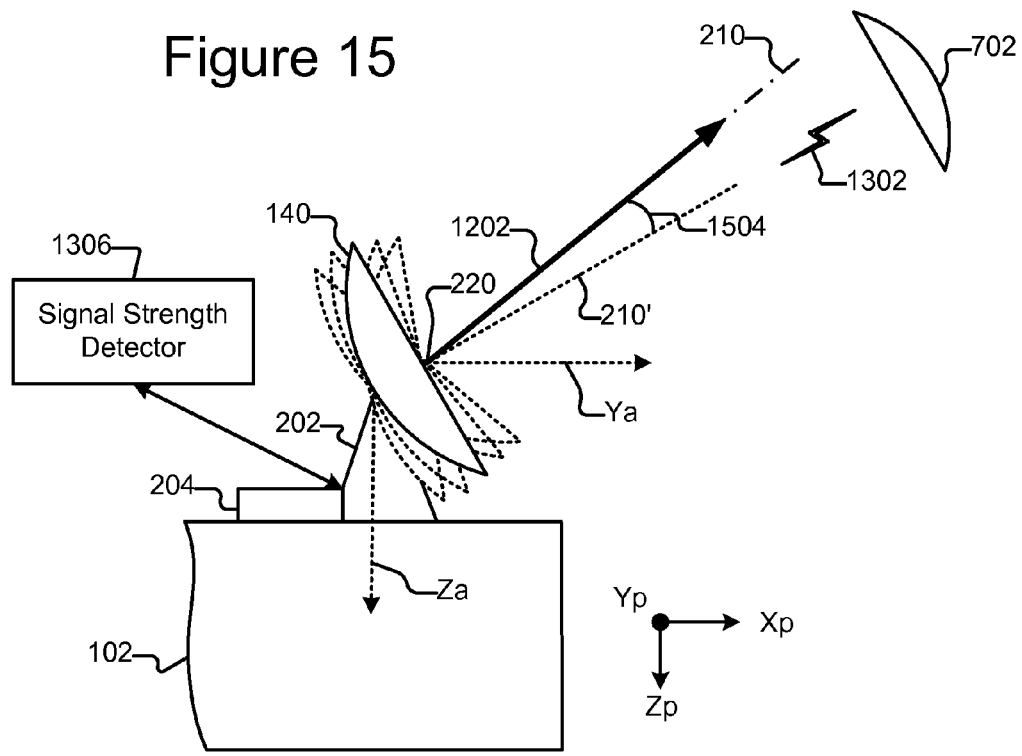
FIG. 15 illustrates moving the antenna in elevation through an angle that corresponds to a detected peak strength of a test signal transmitted between the first target and the antenna.

Returning to FIG. 6, after the process 600 determines at step 608 the delta azimuth angle $\Delta Az_1$ 1304, the process 600 can determine at step 610 a delta elevation angle $\Delta Ev_1$ through which the antenna 140 is rotated that corresponds to a peak detected signal strength of the test signal 1302 from the first target 702. As shown in FIG. 15 (which shows a partial, side view of the platform 120), the antenna 140 can be rotated in elevation (i.e., rotated from the azimuth plane $X_a, Y_a$ toward or away from the $Z_a$ axis) while receiving and monitoring the strength of the test signal 1302 from the first target 702. The elevation angle through which the antenna 140 (more specifically the bore sight 210) is rotated from the uRPV1 1202 to the peak strength of the test signal 1302 as detected at the antenna 140 is the delta elevation angle $\Delta Ev_1$ 1504.

Figure 16:
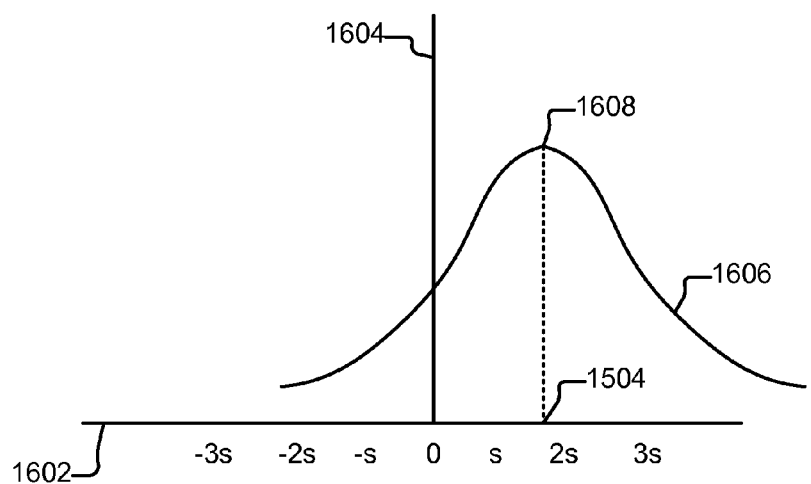
FIG. 16 is a graph of the strength of the test signal verses elevation rotation of the antenna.

The foregoing is further illustrated in FIG. 16, which shows a plot 1606 of the test signal 1302 as received at the antenna 140 while the antenna 140 is rotated in elevation (see FIG. 15). The horizontal axis 1602 represents rotation of the bore sight 210 of the antenna 140 in elevation from the uRPV1 1202 in multiples of a step size s. Positive angles along the horizontal axis 1602 represent counter clockwise (nose up if the platform 120 is an aircraft) angular rotations from the uRPV1 in FIG. 15, and negative angles along the horizontal axis 1602 represent clockwise (nose down if the platform 120 is an aircraft) angular rotation from the uRPV1 in FIG. 15. The vertical axis 1604 in FIG. 16 represents the strength of the test signal 1302 received at the antenna 140.

As shown, as the antenna 140 is rotated in elevation in both positive and negative angular directions from the uRPV1 1202, the strength of the test signal 1302 at the antenna 140 varies. The delta elevation angle $\Delta Ev_1$ 1504 (see also FIG. 15) that corresponds to the detected peak strength 1608 can thus be determined at step 610 of FIG. 6.

It is noted that the range of elevation angles over which the antenna 140 can be rotated at step 610 can be relatively large in some embodiments. For example, the antenna 140 can be rotated in elevation at least twenty degrees in the positive direction and at least twenty degrees in the negative direction from the uRPV1 in some embodiments. The delta elevation angle $\Delta Ev_1$ 1504 determined at step 610 of FIG. 6 can thus be greater than five degrees, ten degrees, fifteen degrees, twenty degrees, or more in some embodiments.

As noted above, the test signal 1302 can instead be transmitted from the antenna 140 to the first target 702. In such an embodiment, the strength of the test signal 1302 can be monitored at the first target 702 rather than the antenna 140.

Returning to FIG. 6, at step 612, the process 600 can determine the cRPV1 that points the antenna 140 directly at the first target 702 and is thus equivalent to the cRPV 534 of FIGS. 5A and 5C. That is, at step 612, the process 600 determines the cRPV1, which compensates for the imperfection offsets. This can be done by adding the $\Delta Az_1$ determined at step 608 and the $\Delta Ev_1$ determined at step 610 to the uRPV1 1202 determined at step 904 as part of step 606. As noted, the uRPV1 1202 does not point the antenna 140 directly at the first target 702. Presumably, however, peak strength of the test signal 1302 as detected at the antenna 140 corresponds to the antenna 140 being pointed directly at the first target 702. Step 612 can thus be performed by adding the delta azimuth angle $\Delta Az_1$ determined at step 608 and the delta elevation angle $\Delta Ev_1$ determined at step 610 to the uRPV1 1202. The cRPV1 determined at step 612 can thus be the vector result of adding the delta azimuth angle $\Delta Az_1$ determined at step 608 and the delta elevation angle $\Delta Ev_1$ determined at step 610 to the uRPV1 1202 determined at step 902 as part of step 606.

After step 612, the process 600 has determined for the equation of FIG. 5A with respect to the first target 702 both the EPV1 (equivalent to 502 in FIG. 5A) and the cRPV1 (equivalent to 534 in FIG. 5A). As discussed below, steps 614 through 620 of FIG. 6 are similar to steps 606 through 612 except that steps 614 through 620 are performed with regard to the second target 704. As will be seen, the results of steps 614 through 620 are an EPV2 and cRPV2 for the second target 704.

Referring again to FIG. 6, at step 614, the process 600 can point the antenna 140 at the second target 704 without taking into consideration the imperfection offsets, which as discussed above, are not known. This can be accomplished generally in the same way as step 606 was performed. For example, step 614 can be accomplished by the process 900 of FIG. 9 generally as discussed above with respect to step 606 except that the process 900 is performed with respect to the second target 704.

That is, in performing step 614, the process 900 can determine at step 902 the EPV2 (rather than EPV1) from the antenna 140 to the second target 704, which can be accomplished using the positions of the antenna 140 and the second target 704 as determined at step 604 of FIG. 6. Generally as discussed above, the process 1000 of FIG. 10 can be used to perform step 902. The process 1000 can operate as discussed above except the altitude Talt$_2$ of the second target 704 is used in place of the Talt$_1$ of the first target 702 in the vector 1002; the angular latitude Tlat$_2$ of the second target 704 is used in place of the angular latitude Tlat$_1$ of the first target 702 in the rotation matrix 1006; and the angular longitude Tlon$_2$ of the second target 704 is used in place of the angular longitude Tlon$_1$ of the first target 702 in the rotation matrix 1010. The resulting vector 1024 is the EPV2 from the antenna 140 to the second target 704, which can be expressed as x, y, and z coordinates EPV2$_x$, EPV2$_y$, and EPV2$_z$ in the earth fixed coordinate frame.

At step 904, the process 900 can determine from the EPV2 the uRPV2, which is the same as uRPV1 except it points to the second target 704. This can be accomplished by starting the process 500 of FIG. 5A with the EPV2 expressed as EPV2$_x$, EPV2$_y$, and EPV2$_z$ rather than the EPV 502 shown in FIG. 5A. The steps 504 and 512 can then be performed on the EPV2. The resulting vector will thus be the uRPV2 (equivalent to 532 in FIGS. 5A and 5B) from the antenna 140 to the second target 704, which can be expresses as x, y, and z coordinates uRPV2$_x$, uRPV2$_y$, and uRPV2$_z$ in the earth fixed coordinate frame.

At step 906 of FIG. 9, the process 900 can extract from the uRPV2 the azimuth angle Az$_2$ and elevation angle EV$_2$. As discussed above and illustrated in FIG. 11, this can be done by converting uRPV2 from x, y, z coordinates to polar coordinates.

Figure 17:
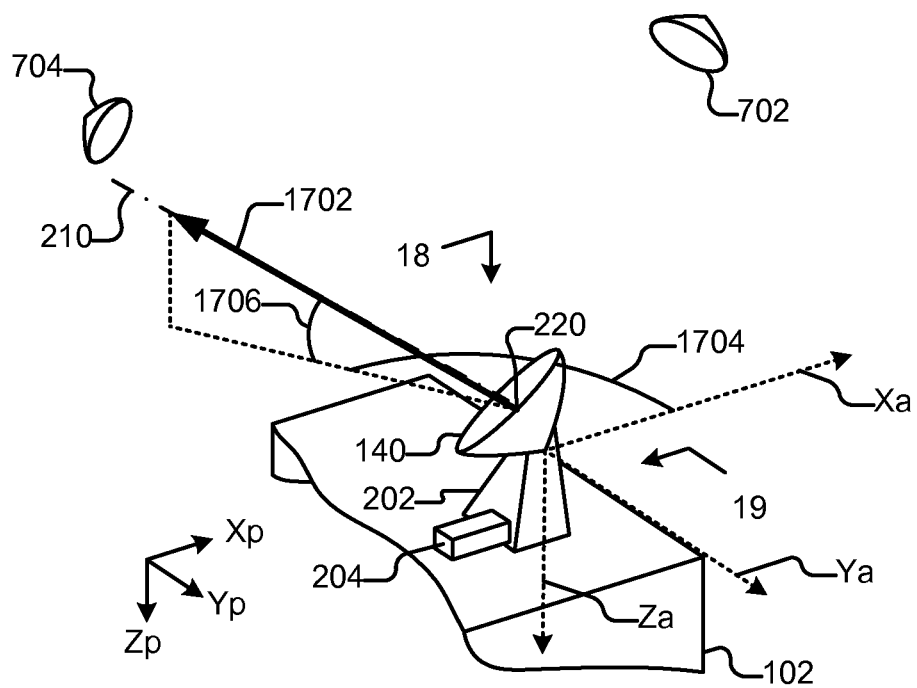
FIG. 17 illustrates an example of pointing the antenna at a second target.

At step 908 of FIG. 9, the process 900 can move the antenna 140 through the azimuth angle Az$_2$ and elevation angle Ev$_2$ obtained from the uRPV2 at step 906. Generally consistent with the discussion of FIG. 4 above, this points the antenna 140 at the second target 704. More specifically, as illustrated in FIG. 17, this points the bore sight 210 of the antenna 140 at the second target 704. In FIG. 17, the uRPV2 is labeled 1702, the azimuth angle Az$_2$ is labeled 1704, and the elevation angle Ev$_2$ is labeled 1706. As noted above, however, the uRPV2 1702 does not account for the imperfection offsets. Consequently, the uRPV2 1702 does not cause the bore sight 210 of the antenna 140 to point directly at the second target 704. Rather, the bore sight 210 is askew from the second target 704 due to the imperfection offsets.

Figure 18:
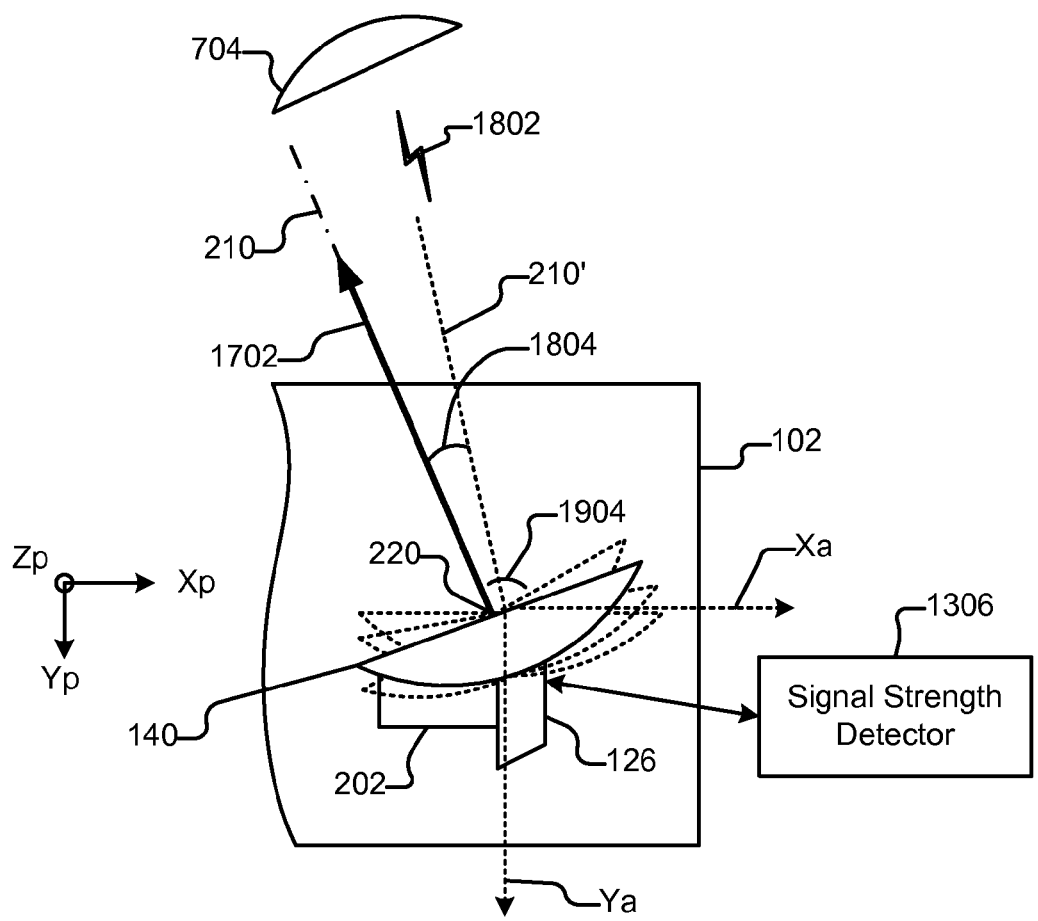
FIG. 18 illustrates moving the antenna in an azimuth plane through an angle that corresponds to a detected peak strength of a test signal transmitted between the second target and the antenna.

Returning to FIG. 6, after the process 600 points the antenna 140 at the second target 704 at step 614, the process 600 determines at step 616 a delta azimuth angle ΔAz$_2$ through which the antenna 140 is rotated from the uRPV2 1702 that corresponds to a peak signal strength of an RF test signal 1802 (see FIG. 18) transmitted between the second target 704 and the antenna 140. Although the test signal 1802 is discussed hereinafter as being transmitted by the second target 704 to the antenna 140, the test signal 1802 can instead be transmitted from the antenna 140 to the second target 704. FIG. 18 illustrates an example in which the test signal 1802 is transmitted from the second target 704 to the antenna 104.

As shown in FIG. 18 (which shows a partial, top view of the platform 120), the antenna 140 can be rotated (e.g., stepped) from the uRPV2 1702 in the azimuth plane X$_a$, Y$_a$ while receiving a test signal 1802 from the second target 704. Similar to determining the delta azimuth angle ΔAz$_1$ 1304 with regard to the first target 702 as illustrated in FIGS. 13 and 14 above, the strength of the test signal 1802 at the antenna 140 can be monitored, for example, with the signal detector 1306, or as otherwise described above. The delta azimuth angle ΔAz$_2$ 1804 through which the antenna 140 (more specifically the bore sight 210) is rotated from the uRPV2 1702 to the peak strength of the test signal 1802 as detected at the antenna 140 is the delta azimuth angle ΔAz$_2$ 1804.

Similar to step 608, the range of azimuth angles over which the antenna 140 can be rotated at step 616 can be relatively large in some embodiments. For example, the antenna 140 can be rotated in the azimuth plane X$_a$, Y$_a$ at least twenty degrees in the positive direction and at least twenty degrees in the negative direction from the uRPV2, the delta azimuth angle ΔAz$_2$ 1804 determined at step 616 of FIG. 6 can thus be as large as twenty degrees, or more in some embodiments.

Figure 19:
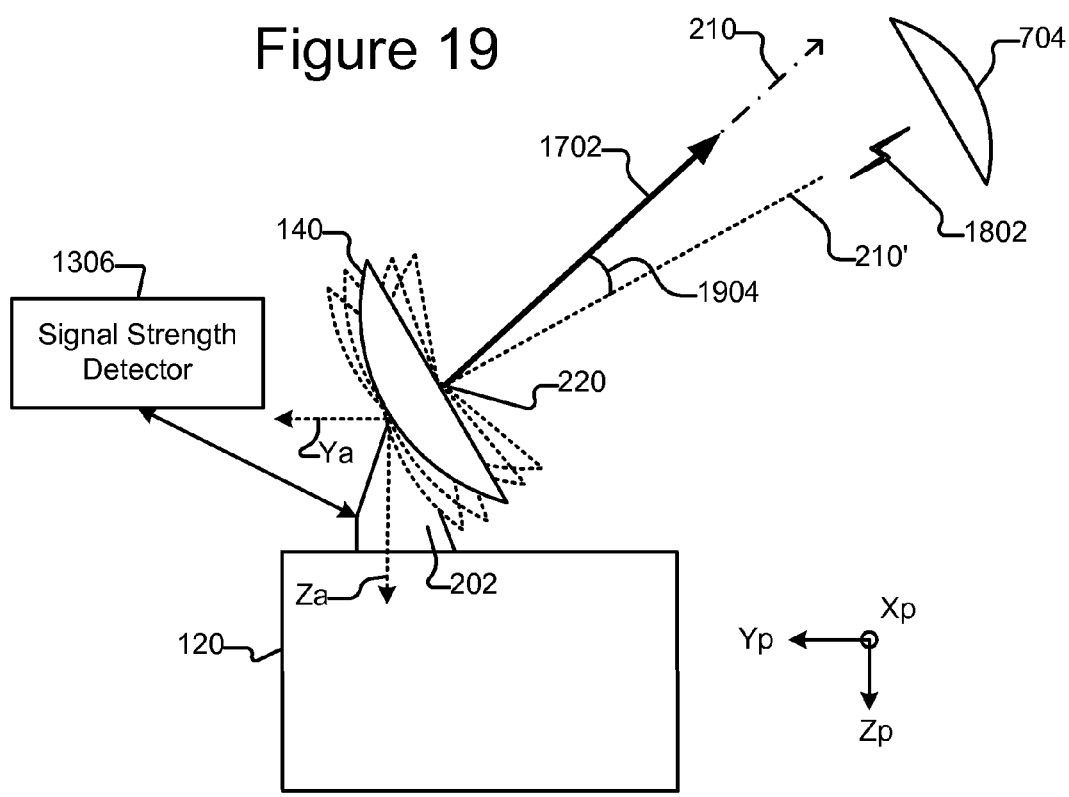
FIG. 19 illustrates moving the antenna in elevation through an angle that corresponds to a detected peak strength of a test signal transmitted between the second target and the antenna.

Returning to FIG. 6, after the process 600 determines at step 616 the delta azimuth angle ΔAz$_2$ 1804, the process 600 can determine at step 618 a delta elevation angle ΔEv$_2$ through which the antenna 140 is rotated from the uRPV2 1702 that corresponds to a peak signal strength of the test signal 1802 from the second target 704. As shown in FIG. 19 (which shows a side view of the platform 120), the antenna 140 can be rotated (e.g., stepped) in elevation (from the azimuth plane X$_a$, Y$_a$ to or way from the Z$_a$ axis) while receiving the test signal 1802 from the second target 704. Similar to determining the delta elevation angle ΔEv$_1$ 1504 with regard to the first target 702 as illustrated in FIGS. 15 and 16 above, the strength of the test signal 1802 at the antenna 140 can be monitored, for example, with the signal detector 1306 as shown in FIG. 19 or as otherwise described above. The elevation angle through which the antenna 140 (more specifically the bore sight 210) is rotated from the uRPV2 1702 to the peak strength of the test signal 1802 as detected at the antenna 140 is the delta elevation angle ΔEv2$_1$ 1904.

Again, it is noted that the range of elevation angles over which the antenna 140 can be rotated at step 618 can be relatively large in some embodiments. For example, the antenna 140 can be rotated in elevation at least twenty degrees in the positive direction and at least twenty degrees in the negative direction from the uRPV2 1702, delta elevation angle ΔEv$_2$ 1904 determined at step 618 of FIG. 6 can thus be as large as twenty degrees or more in some embodiments. As noted above, the test signal 1802 can instead be transmitted from the antenna 140 to the second target 704. In such an embodiment, the strength of the test signal 1802 can be monitored at the second target 704 rather than the antenna 140.

Returning to FIG. 6, at step 620, the process 600 can determine the cRPV2 that points the antenna 140 directly at the second target 704 and is thus equivalent to the cRPV 534 of FIGS. 5A and 5C for the second target 704. That is, at step 620, the process 600 determines the cRPV2, which accounts not only for the orientation of the platform 120 and the intentional offsets but also accounts for the imperfection offsets. This can be done by adding the ΔAz$_2$ determined at step 616 and the ΔEv$_2$ determined at step 618 to the uRPV2 1702 determined as part of step 614. As noted, the uRPV2 1702 does not point the antenna 140 directly at the second target 704. Presumably, however, the peak strength of the test signal 1802 at the antenna 140 corresponds to the antenna 140 being pointed directly at the second target 704. Step 620 can thus be performed by adding the azimuth angle ΔAz$_2$ determined at step 616 and the elevation angle ΔEv$_2$ determined at step 618 to the uRPV2 1702 determined as part of step 614. The cRPV2 determined at step 620 can thus be the vector result of adding the azimuth angle ΔAz$_2$ determined at step 616 and the elevation angle ΔEv$_2$ determined at step 618 to the uRPV2 1702 determined as part of step 614.

As noted above, after step 612, the process 600 has determined an EPV1 and a cRPV1 for the first target 702 that are equivalent to the EPV 502 and cRPV 534 in the equation of FIG. 5A. After step 620, the process 600 has similarly determined an EPV2 and cRPV2 for the second target 704 that are also equivalent to the EPV 502 and the cRPV 534 in FIG. 5A. After step 620, there are thus two solutions to the equation of FIG. 5A for which there are three unknowns: the imperfection heading the imperfection pitch $\beta_i$, and the imperfection roll $\gamma_i$. At step 622 of FIG. 6, the process 600 can determine the imperfection heading the imperfection pitch $\beta_i$, and the imperfection roll $\gamma_i$.

At step 622, the process 600 can utilize the foregoing two solutions (which are orthogonal to within thirty degrees) to the equation of FIG. 5A to determine the three unknowns. For example, at step 622, the process 600 can utilize one or more optimization or convergence routines to determine the imperfection heading the imperfection pitch $\beta_i$, and the imperfection roll $\gamma_i$ from the EPV1, cRPV1, EPV2, and cRPV2. For example, different values for the unknown imperfection heading $\alpha_1$, imperfection pitch $\beta_i$, and imperfection roll $\gamma_i$ can be selected and the two solutions for the equation of FIG. 5A corresponding to the EPV1/cRPV1 and EPV2/cRPV2 pairs can be repeatedly solved with each of those different values for the unknown imperfection heading $\alpha_1$, imperfection pitch $\beta_i$, and imperfection roll $\gamma_i$. Then, the values that yield the most accurate solutions can be selected as the values for the imperfection heading $\alpha_i$, imperfection pitch $\beta_i$, and imperfection roll $\gamma_i$ determined at step 620.

Figure 20:
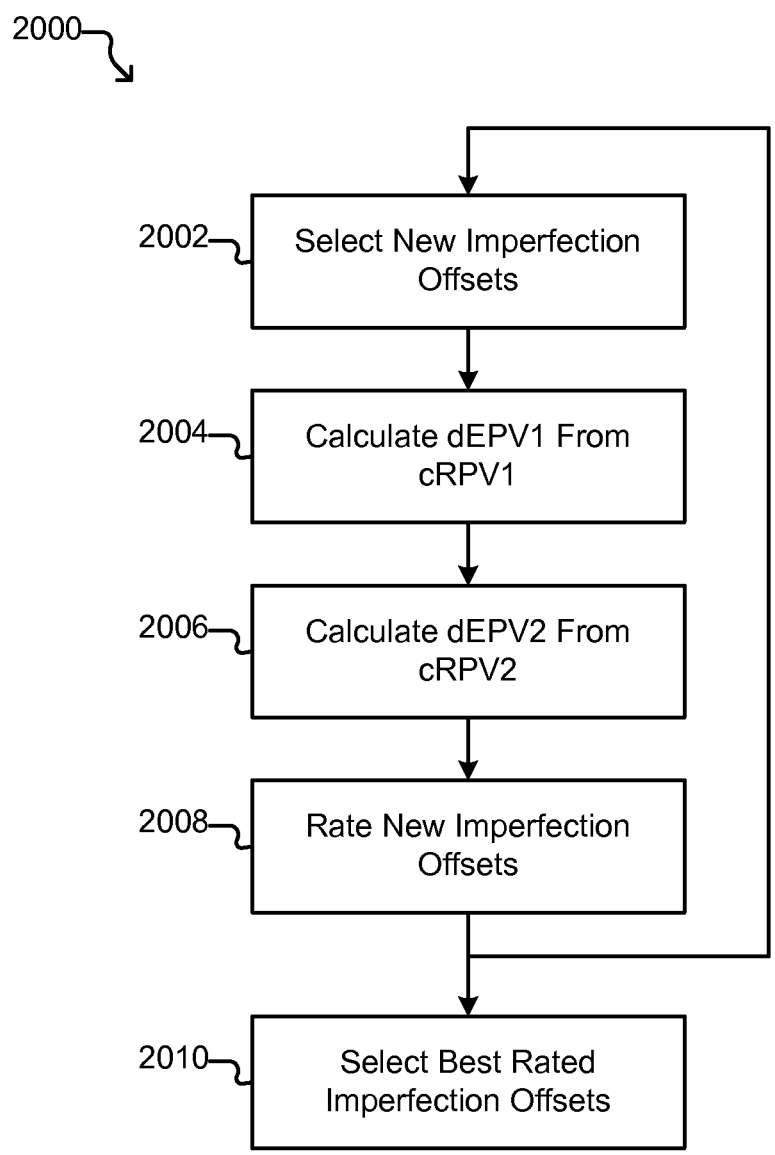
FIG. 20 shows an example of an optimization process for determining the imperfection offsets between the antenna and the platform.

FIG. 20 illustrates an example of such an optimization or convergence process 2000 that can implement step 622. As shown in FIG. 20, at step 2002, the process 2000 selects values for each of the unknown imperfection heading $\alpha_1$, imperfection pitch $\beta_i$, and imperfection roll $\gamma_i$. At step 2004, using the values for the unknown imperfection heading imperfection pitch $\beta_i$, and imperfection roll $\gamma_i$ selected at step 2002, the process 2000 then starts with the cRPV1 (calculated at step 612 of FIG. 6) and derives a version of the EPV1 (herein referred to as the dEPV1) from the cRPV1 using the unknown imperfection heading $\alpha_1$, imperfection pitch $\beta_i$, and imperfection roll $\gamma_i$ selected at step 2002.

Figure 21:
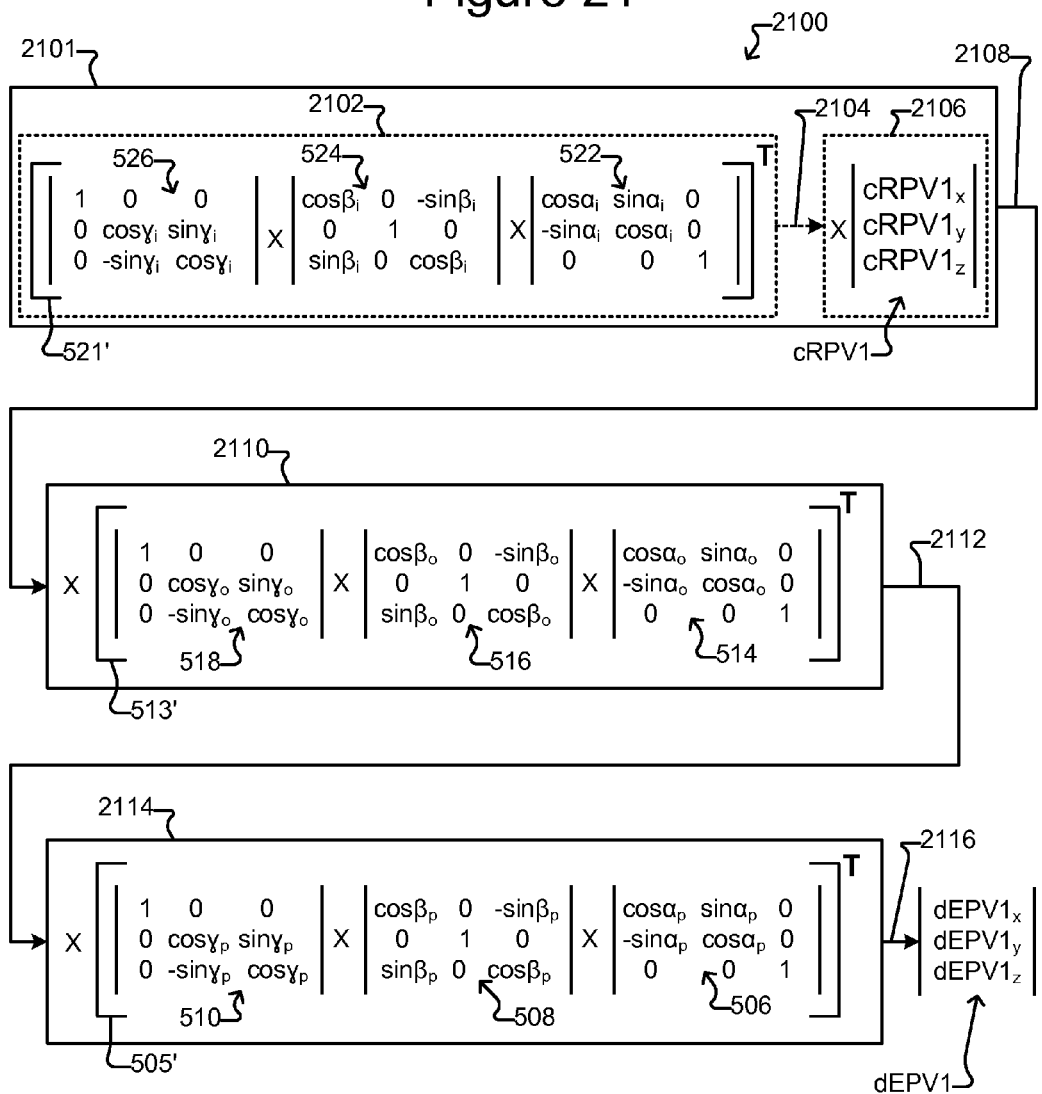
FIG. 21 illustrates a process for calculating a determined earth pointing vector from a corrected relative pointing vector.

FIG. 21 illustrates an example of a process 2100 that can implement step 2004. As shown, the process 2100 can calculate the dEPV1 (which can be expressed in x, y, z coordinates as dEPV1$_x$, dEPV1$_y$, and dEPV$_z$) from the cRPV1 (which can be expressed in x, y, z coordinates as cRPV1$_x$, cRPV1$_y$, and cRPV1$_z$). This is the reverse of the process 500 of FIG. 5A, which as discussed above, calculates an RPV from an EPV. That is, while, as discussed above, the process 500 rotates the EPV through the platform orientation in the order of platform heading angle $\alpha_p$, platform pitch angle $\beta_p$, and platform roll angle $\gamma_p$ at step 504, then rotates the result 530 through the offsets orientation in the order of offsets heading angle $\alpha_o$, offsets pitch angle $\beta_o$, and offsets roll angle $\gamma_o$ at step 512, and then rotates the result 532 through the imperfections orientation in the order of imperfections heading angle imperfections pitch angle $\beta_i$, and imperfections roll angle $\gamma_i$ at step 520 to produce the cRPV 534, the process 2100 rotates the cRPV1 backwards through the imperfections orientation at step 2101, then rotates the result 2108 backwards through the offsets orientation at step 2110, and then rotates the result 2112 backwards through the platform orientation at step 2114 to produce the dEPV1.

That is, at step 2101, the process 2100 rotates the cRPV1 through the imperfections orientation (which consists of the new imperfection offsets selected at step 2002 of FIG. 20) in the order of the imperfections roll angle $\gamma_i$, imperfections pitch angle $\beta_i$, and imperfections heading angle $\alpha_i$, which is the reverse of step 520 in FIG. 5A. As shown in FIG. 21, the process 2100 can accomplish step 2101 by transposing the reverse of the imperfections matrix 521' at sub-step 2102 and then multiplying the cRPV1 at sub-step 2106 by the reverse of the imperfections matrix 521' transposed 2104. In FIG. 21, the matrix labeled 521' (prior to being transposed) is the same as the matrix 521 of FIG. 5A except that the rotation matrices 526, 524, and 522 are in reverse order. The reverse of the imperfections matrix 521' transposed 2104 in FIG. 21 can be calculated at sub-step 2102 as follows: the roll rotation matrix 526 multiplies the pitch rotation matrix 524; the result of the foregoing multiplies the heading rotation matrix 522; and the matrix that results from the foregoing is transposed. Step 2101 in FIG. 21 can thus be accomplished by, at sub-step 2102, calculating the reverse of the imperfections matrix 521' transposed 2104 and then, at sub-step 2106, that result 2104 multiplying the cPRV1. The result 2108 of step 2101 is the cRPV1 rotated backwards through the roll angle $\gamma_i$, pitch angle $\beta_i$, and heading angle $\alpha_i$ of the new imperfections orientation selected at step 2002 of FIG. 20.

At step 2110, the process 2100 rotates the result 2108 through the offsets orientation (which, as discussed above, consists of the intentional offsets between the platform 120 and the antenna 140) in the order of the offsets roll angle $\gamma_o$, offsets pitch angle $\beta_o$, offsets heading angle $\alpha_o$, which is the reverse of step 512 in FIG. 5A. As shown in FIG. 21, the process 2100 can accomplish step 2110 by multiplying the result 2108 by the reverse of the offsets matrix 513' transposed. That is, in FIG. 21, the matrix labeled 513' (prior to being transposed) is the same as the matrix 513 of FIG. 5A except that the rotation matrices 518, 516, and 514 are in reverse order. The reverse of the offsets matrix 513' transposed illustrated in FIG. 21 can be calculated as follows: the roll rotation matrix 518 multiplies the pitch rotation matrix 516; the result of the foregoing multiplies the heading rotation matrix 514; and the matrix that results from the foregoing is transposed. Step 2110 can thus be accomplished by multiplying the result 2108 by the reverse of the offsets matrix 513' transposed, calculated as discussed above. The result 2112 is the result 2108 rotated backwards through the roll angle $\gamma_o$, pitch angle $\beta_o$, and heading angle $\alpha_o$ of the intentional offsets orientation between the platform 120 and the antenna 140.

At step 2114, the process 2100 rotates the result 2112 through the platform orientation (which, as discussed above, consists of the orientation of the platform 120, for example, as reported by the orientation mechanism 206) in the order of the platform roll angle $\gamma_p$, platform pitch angle $\beta_p$, platform heading angle $\alpha_p$, which is the reverse of step 504 in FIG. 5A. As shown in FIG. 21, the process 2100 can accomplish step 2114 by multiplying the result 2112 by the reverse of the platform orientation 505' transposed. That is, in FIG. 21, the matrix labeled 505' (prior to being transposed) is the same as the matrix 505 of FIG. 5A except that the rotation matrices 510, 508, and 506 are in reverse order. The reverse of the platform orientation 505' transposed illustrated in FIG. 21 can be calculated as follows: the roll rotation matrix 510 multiplies the pitch rotation matrix 508; the result of the foregoing multiplies the heading rotation matrix 506; and the matrix that results from the foregoing is transposed. Step 2114 can thus be accomplished by multiplying the result 2112 by the reverse of the platform orientation 505' transposed, calculated as discussed above. The result 2116 is the result 2112 rotated backwards through the roll angle $\gamma_p$, pitch angle $\beta_p$, and heading angle $\alpha_p$ of the platform 120, which is the dEPV1 as illustrated in FIG. 21.

Referring again to FIG. 20, at step 2006, using the values for the unknown imperfection heading $\alpha_1$, imperfection pitch $\beta_i$, and imperfection roll $\gamma_i$ selected at step 2002, the process 2000 starts with the cRPV2 (calculated at step 620 of FIG. 6) and derives a version of the EPV2 (herein referred to as the dEPV2) from the cRPV2 using the imperfection heading imperfection pitch $\beta_i$, and imperfection roll $\gamma_i$ selected at step 2002. This can be accomplished using the process 2100 of FIG. 21 in which the process 2100 starts with the cRPV2 (rather than the cRPV1) and produces as the result 2116 of step 2114 a dEPV2 (rather than the dEPV1) expressed in x, y, z coordinates as dEPV2$_x$, dEPV2$_y$, and dEPV2$_z$.

Still referring to FIG. 20, at step 2008, the process 2000 can rate the values for the imperfection heading $\alpha_1$, imperfection pitch $\beta_i$, and imperfection roll $\gamma_i$ selected at step 2002. For example, the closer the values selected for the imperfection heading $\alpha_1$, imperfection pitch $\beta_i$, and imperfection roll $\gamma_i$ at step 2002 are to the actual values, the closer the dEPV1 determined at step 2004 will be to the EPV1 determined at part of step 606 of FIG. 6 and the closer the dEPV2 determined at step 2006 will be to the EPV2 determined as part of step 614 of FIG. 6. Step 2008 can thus rate the values for the imperfection heading $\alpha_1$, imperfection pitch $\beta_i$, and imperfection roll $\gamma_i$ selected at step 2002 by differences between the dEPV1 and the EPV1 and differences between the dEPV2 and the EPV2.

FIG. 22 illustrates an example of a calculation 2200 that can be used at step 2008 to rate the values for the imperfection heading $\alpha_1$, imperfection pitch $\beta_i$, and imperfection roll $\gamma_i$ selected at step 2002. As shown in the FIG. 22, an "error" value equal to the square root of the sum of the squares of the differences between the x, y, z components of the dEPV1 and the EPV1 and the differences between the x, y, z components of the dEPV2 and the EPV2 can be calculated, and the "error" value can be a rating of the values for the imperfection heading imperfection pitch $\beta_i$, and imperfection roll $\gamma_i$ selected at step 2002. Thus, at step 2008, the process can calculate the "error" value shown in FIG. 22, and the "error" value shown in FIG. 22 can comprise a rating determined at step 2008. In some embodiments, any value of the "error" that is greater than two times the sum of the uncertainty $U_P$ 806 of the location of the antenna 140 and the uncertainty $U_T$ 816 of the location of the targets 702 and 704 (see FIG. 8) indicates a rating at step 2008 that the values for the imperfection heading $\alpha_1$, imperfection pitch $\beta_i$, and imperfection roll $\gamma_i$ selected at step 2002 are wrong or are likely wrong.

As shown in FIG. 20, the process 2000 can be performed as a convergence process in which the steps 2002 through 2008 are repeated, and in each pass through the steps 2002 through 2008, at least one of the values for the imperfection heading $\alpha_1$, imperfection pitch $\beta_i$, and imperfection roll $\gamma_i$ at step 2002 is changed. For example, process 2000 can repeat the steps 2002 through 2008 each time stepping at step 2002 one of the values for the imperfection heading $\alpha_i$, imperfection pitch $\beta_i$, and imperfection roll $\gamma_i$ until the steps 2002 through 2008 have been performed for values of each of the imperfection heading $\alpha_i$, imperfection pitch $\beta_i$, and imperfection roll $\gamma_i$ stepped through a range of positive and negative angles from zero, wherein R is the range and S is the step size. In some embodiments, R can be plus or minus at least two degrees, three degrees, four degrees, five degrees, or more, and S can be no more than one of the foregoing: a tenth of a degree, a fifth of a degree, a quarter of a degree, a half of a degree, or a degree. The foregoing numerical ranges are examples only and are not limiting.

It is noted that, because new imperfection offsets are selected at step 2002 of FIG. 20 for each new pass through the process 2000, the calculation of the reverse of the imperfections matrix 521' transposed 2104 at sub-step 2102 will be different at step 2102 of FIG. 21 for each such pass through the process 2000 of FIG. 20. In contrast, the calculations of the reverse of the offsets orientation matrix 513' transposed at step 2110 and the reverse of the platform orientation matrix 505' transposed at step 2114 of FIG. 21 will be the same for each such pass through the process 2000. The reverse of the offsets orientation matrix 513' transposed at step 2110 and the reverse of the platform orientation matrix 505' transposed at step 2114 of FIG. 21 thus need not be re-calculated for each pass through the process 2000.

The number of times the steps 2002 through 2008 are repeated can be such that each of the imperfection heading $\alpha_1$, imperfection pitch $\beta_i$, and imperfection roll $\gamma_i$ are stepped through each step size S over a range R as discussed above. Alternatively, the process 2000 can proceed to step 2010 after an acceptable rating is determined at step 2008. For example, the process 2000 can repeat until the "error" value of the equation 2200 of FIG. 22 is an acceptable value. In some embodiments, the process 2000 can repeat steps 2002 through 2008 each time with at least one new value of the imperfection heading $\alpha_1$, imperfection pitch $\beta_i$, and imperfection roll $\gamma_i$, as discussed above, at least until the value of the "error" from the calculation 2200 of FIG. 22 is less than two times the sum of the uncertainty $U_P$ 806 of the location of the antenna 140 and the uncertainty $U_T$ 816 of the location of the targets 702 and 704 in FIG. 8.

Regardless of how the process 2000 determines to proceed to step 2010, at that step, the process 2000 can select one of the sets of one value each for the imperfection heading $\alpha_i$, imperfection pitch $\beta_i$, and imperfection roll $\gamma_i$ selected at step 2002. For example, the process 2000 can select at step 2010 the imperfection heading $\alpha_1$, imperfection pitch $\beta_i$, and imperfection roll $\gamma_i$ selected at step 2002 that had the best rating at step 2008. For example, this can be the set that had the lowest "error" value as calculated at step 2008 per the calculation 2200 of FIG. 22.

The imperfection heading $\alpha_1$, imperfection pitch $\beta_i$, and imperfection roll $\gamma_i$ selected at step 2010 of FIG. 20 are the imperfection heading $\alpha_1$, imperfection pitch $\beta_i$, and imperfection roll $\gamma_i$ determined at step 622 of FIG. 6. As noted above, the process 2000 of FIG. 20 is an example of a process for performing the step 622 of FIG. 6. As also noted, a purpose of the process 600 of FIG. 6 is to determine the imperfection heading $\alpha_1$, imperfection pitch $\beta_i$, and imperfection roll $\gamma_i$ between the platform 120 (e.g., the heading $\alpha_p$, pitch $\beta_p$, and roll $\gamma_p$ of the platform 120 as provided by the orientation mechanism 206 of FIG. 2) and the antenna 140 that are due to unknown imperfections (e.g., manufacturing imperfections, imperfections in the mounting of the antenna 140 to the platform 120, and/or the like). The imperfection heading $\alpha_i$, imperfection pitch $\beta_i$, and imperfection roll $\gamma_i$ determined at step 622 meet this purpose.

Thereafter, as shown in FIG. 6, the process 600 can store at step 624 the imperfection heading $\alpha_1$, imperfection pitch $\beta_i$, and imperfection roll $\gamma_i$ determined at step 622. For example, the process 600 can store at step 624 the imperfection heading imperfection pitch $\beta_i$, and imperfection roll $\gamma_i$ determined at step 622 in the memory 304 of FIG. 3. Alternatively or in addition, the controller 302 can output the imperfection heading imperfection pitch $\beta_i$, and imperfection roll $\gamma_i$ determined at step 622, for example, through the input/output 306. For example, the imperfection heading $\alpha_1$, imperfection pitch $\beta_i$, and imperfection roll $\gamma_i$ determined at step 622 can be output to a display or printer and thus provided in human readable form to a human user. As noted, the process 600 can be performed in whole or in part by a human operator. In such a case, the human operator can simply note at step 624 the imperfection heading $\alpha_1$, imperfection pitch $\beta_i$, and imperfection roll $\gamma_i$ determined at step 622.

Figure 24:
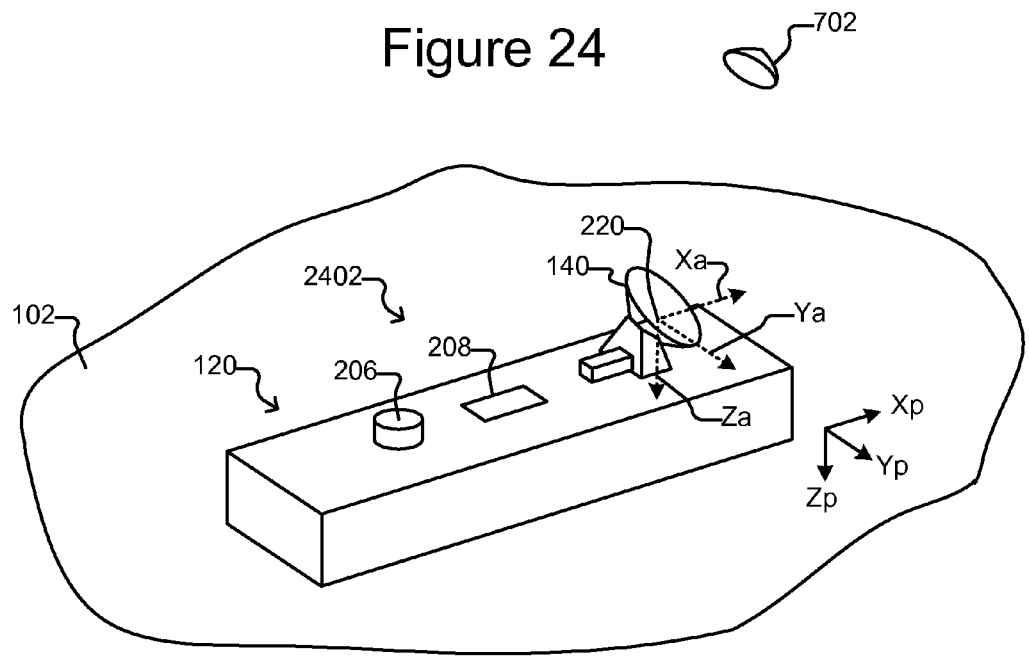
FIG. 24 shows an example of positioning the platform and the target.

The process 600 is but an example of a process for determining with two targets 702 and 704 the imperfection offsets consisting of an imperfection heading $\alpha_i$, imperfection pitch $\beta_i$, and imperfection roll $\gamma_i$. Variations of the process 600 are possible. For example, in alternative versions of the process 600 of FIG. 6, the targets 702 and 704 need not be placed such that the angle 706 in the azimuth plane $X_a$, $Y_a$ (as defined above with respect to FIG. 4) between the signal path 708 from the antenna 140 to the first target 702 projected onto the azimuth plane and the signal path 710 from the antenna 140 to the second target 704 projected onto the azimuth plane is between sixty degrees (60°) and one-hundred twenty degrees (120°) inclusive (see FIG. 7). If the targets 702 and 704 are positioned (e.g., at step 602 of FIG. 6) such that the angle 706 is not between sixty degrees (60°) and one-hundred twenty degrees (120°) inclusive, the process 600 of FIG. 6 can be modified to include a moving step (not shown) between steps 612 and 614 in which the platform 120 is moved in such a way that that the difference between the azimuth angle uAz$_1$ 1204 (see FIG. 12) utilized to point to the first target 702 at step 606 and the azimuth angle uAz$_2$ 1704 (see FIG. 17) used to point to the second target 704 at step 614 is between sixty degrees (60°) and one-hundred twenty degrees (120°) inclusive. In such a modified version of the process of FIG. 6, the uRPV1 calculated as part of step 606 would be calculated from the EPV of the platform 120 in its location prior to the moving step (not shown in FIG. 6) between steps 612 and 614, and the uRPV2 calculated as part of step 614 would be calculated from the EPV of the platform 120 in its location after the moving step (not shown in FIG. 6) between steps 612 and 614. Moreover, if the step of moving the platform 120 between steps 612 and 614 involves only rotating the platform 120 about the axis $Z_a$ through the phase center 220 of the antenna 140, then the platform 120 is rotated (and thus has a different orientation) but otherwise is effectively in the same location before and after the rotation, and the location of platform 120 is the same for purposes of calculating the uRPV1 as part of step 606 as for calculating the uRPV2 as part of step 614. On the other hand, if the moving step (not shown) between steps 612 and 614 includes translating the platform 120, the new location of the The process 2300 of FIG. 23 is another example of a variation of the process 600 of FIG. 6. As will be seen, the process 2300 is similar to the process 600 in the sense that the process 2300 determines a cRPV1 and a cRPV2 discussed above and uses those vectors to determine the imperfection heading $\alpha_i$, imperfection pitch $\beta_i$, and imperfection roll $\gamma_i$. Unlike the process 600, however, the process 2300 utilizes only one target rather than two targets. For example, as shown in FIG. 24, the process 2300 can be performed with only the first target 702.

As shown in FIG. 23, at step 2302, the process 2300 can position the platform 120 and the first target 702 such that the first target 702 can transmit test signals to and/or receive test signals from the antenna 140. As illustrated in FIG. 24, the platform 120 and the first target 702 can be placed in stationary positions with respect to the surface 102 of the earth. This can be accomplished generally as discussed above with respect to step 602 of FIG. 6. Step 2302 can thus be performed in the same way as step 602 except step 2302 does not include the second target 704.

At step 2304 of FIG. 23, the process 2300 can determine the locations of the antenna 140 and the first target 702 in the earth fixed coordinate frame. This can be accomplished generally as discussed above with respect to step 604 of FIG. 6. For example, the process 2300 can determine the Palt, Plon, and Plat of the phase center 220 of the antenna 140 and the Talt$_1$, Tlon$_1$, and Tlat$_1$ of the phase center of the first target 702 (see Table 1 above) as discussed above with respect to step 604. Step 2304 can thus be performed in the same way as step 604 except step 2304 does not include the second target 704.

At steps 2306 through 2312, the process 2300 can determine a cRPV1 from the antenna 140 (e.g., the phase center 210 of the antenna 140) to the first target 702 (e.g., the phase center of the first target 702). The steps 2306 through 2312 can be the same as steps 606 through 612 and thus can be performed in the same way as steps 606 through 612 as those steps are discussed and described above. That is, step 2306 can be performed in the same way as step 606 by determining the uRPV1 from the EPV1 and then pointing the antenna 140 at the first target 702 in accordance with the uRPV1, for example, as illustrated in and discussed above with respect to FIGS. 9-12. As noted above with regard to step 904 of FIG. 9, the uRPV1 can be calculated from the EPV1 by the process 500 of FIG. 5A. As will be seen, the orientation of the platform 120 consisting of the platform heading $\alpha_p$, the platform pitch $\beta_p$, and the platform roll $\gamma_p$ used at step 504 of FIG. 5A in performing the step 2306 can be deemed a first orientation of the platform 120. As previously noted, the orientation of the platform 120 can be obtained from the orientation mechanism 206 of FIG. 2.

Returning to FIG. 23, step 2308 can be performed in the same way as step 608 to rotate the antenna 140 through a delta azimuth angle $\Delta Az_1$ to a peak detected signal strength of a test signal transmitted between the first target 702 and the antenna 140. This can be accomplished, for example, as illustrated in FIGS. 13 and 14 as discussed above. Step 2310 can be performed in the same way as step 610 to rotate the antenna 140 through a delta elevation angle $\Delta Ev_1$ to a peak detected signal strength of a test signal transmitted between the first target 702 and the antenna 140, which can be accomplished, for example, as illustrated in FIGS. 15 and 16 as discussed above. Step 2312 can be performed the same as step 612 to determine the cRPV1 from the uRPV1, the $\Delta Az_1$, and the $\Delta Ev_1$ as discussed above with respect to step 612.

At step 2314 of FIG. 23, the process 2300 can move the platform 120. The first target 702, however, is not moved. As will be seen, the step 2314 of moving the platform 120 can involve only rotating the platform 120 about the axis $Z_a$ through the phase center 220 of the antenna 140. Alternatively, the step 2314 of moving the platform 120 can include translating the platform 120. Regardless, as will also be seen, the step 2314 of moving the platform 120 can be such that the difference between the azimuth angle uAz$_1$ 1204 (see FIG. 12) utilized to point to the first target 702 at step 2306 and the azimuth angle uAz$_2$ 1704 (see FIG. 17) used to point to the first target 702 at step 2316 is between sixty degrees (60°) and one-hundred twenty degrees) (120° inclusive.

Figure 25:
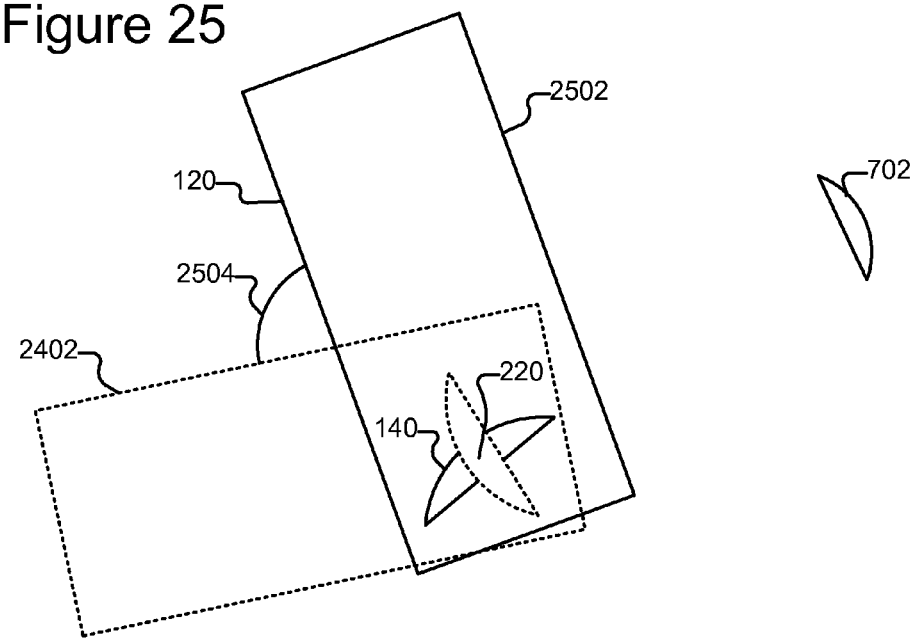
FIG. 25 illustrates an example of rotating the platform.

FIG. 25 illustrates a first example of moving the platform 120 at step 2314 in which the platform 120 is rotated about the $Z_a$ axis (which as discussed above with respect to FIG. 4, passes through the phase center 220 of the antenna 140) but is not translated. In FIGS. 24 and 25, the original position of the platform 120 is identified as 2402, and as shown in FIG. 25, the platform is rotated about the axis $Z_a$ through the phase center 220 of the antenna 140 from the position 2402 to the rotated position 2502. As also shown in FIG. 25, the rotation of the platform 120 at step 2314 can be through an angle 2504 between sixty degrees (60°) and one-hundred and twenty degrees (120°) inclusive. Because the rotation is about the $Z_a$ axis and the platform 120 is not also translated, the platform 120 is rotated but otherwise is effectively in the same location as determined at step 2304. Although the orientation of the platform 120 changes, the location of the platform 120 is thus the same before and after the moving step 2314. If alternatively, the moving of the platform 120 at step 2314 also includes translating the platform 120, the location of the platform 120 is different after the moving step 2314.

After the moving step 2314, steps 2316 through 2322 can be performed in the same way that steps 2306 through 2312 were performed but with the platform moved per step 2314. That is, step 2316 is performed the same as step 2306 but with the platform moved per step 2314. If the platform 120 was merely rotated at step 2314, the platform 120 and the first target 702 are effectively in the same position, and the EPV from the phase center of the antenna 140 to the first target 702 is the same, namely, the EPV1 discussed above with respect to step 2306. If, on the other hand, the platform 120 was also translated at step 2314, the platform 120 is in a new location, and the new location of the platform 120 is used to calculate a new EPV, namely, an EPV2 from the platform 120 in its new location to the first target 702.

Regardless, the uRPV2 determined as part of step 2316 will be different because at least the orientation of the platform 120 consisting of the platform heading $\alpha_p$, the platform pitch $\beta_p$, and the platform roll $\gamma_p$ is different due to at least rotation and possibly also translation of the platform 120 at step 2314. The orientation of the platform 120 after the moving step 2314 is thus a second orientation of the platform 120. It is this second orientation of the platform 120 that is used at step 2316 by the process 2300 to determine the second uRPV2. The step 2316 can thus be performed in the same way as the step 2306 except that the first orientation of the platform 120 is used at step 504 in FIG. 5A in performing step 2306 but the second orientation of the platform 120 is used at step 504 in FIG. 5A in performing step 2316.

Because the uRPV2 is different than the uRPV1, the ΔAz determined at step 2318, and the ΔEv determined at step 2320 will also have different values than determined at steps 2308 through 2312 due to the rotation and possibly translation of the platform 120 at step 2314. For this reason, not only is the uRPV determined as part of step 2316 a uRPV2, the ΔAz determined at step 2318 is a $\Delta Az_2$, and the ΔEv determined at step 2320 is a $\Delta Ev_2$. At step 2322, the process 2300 can determine the cRPV2 from the uRPV2 determined as part of step 2316, the $\Delta Az_2$ determined at step 2318, and the $\Delta Ev_2$ determined at step 2320. This can be performed in the same way as step 620 in FIG. 6 as described above.

Generally similar to the process 600 of FIG. 6, after step 2312, the process 2300 has determined an EPV1 and a cRPV1 for the platform 120 prior to the rotation of step 2314 that are equivalent to the EPV 502 and cRPV 534 in the equation of FIG. 5A. After step 2322, the process 2300 has similarly determined an EPV2 and cRPV2 for the platform 120 after the rotation of step 2314 that are also equivalent to the EPV 502 and the cRPV 534 in FIG. 5A. Generally as discussed above with respect to FIG. 6, there are thus two solutions (which are orthogonal to within thirty degrees) to the equation of FIG. 5A for which there are three unknowns: the imperfection heading the imperfection pitch $\beta_i$, and the imperfection roll $\gamma_i$.

At step 2324 of FIG. 23, the process 2300 can determine the imperfection heading the imperfection pitch $\beta_i$, and the imperfection roll $\gamma_i$ from the cRPV1 and the cRPV2. This can be accomplished in the same way as step 622 is performed as discussed above except that the EPV1 is used in place of both the EPV1 and the EPV2 in the discussion of step 622 including the discussion of FIGS. 20-22. Step 2326 in FIG. 23 can be the same as step 624 as discussed above with respect to FIG. 6.

Whether determined by the process 600 or process 2300, having determined the imperfection heading $\alpha_1$, imperfection pitch $\beta_i$, and imperfection roll the antenna 140, and more specifically the bore sight 210 of the antenna 140, has been aligned with the platform 120, or if the platform 120 includes the orientation mechanism 206 of FIG. 2, the orientation mechanism 206, accounting for the imperfection heading $\alpha_1$, imperfection pitch $\beta_i$, and imperfection roll $\gamma_i$. Thereafter, the imperfection heading $\alpha_1$, imperfection pitch $\beta_i$, and imperfection roll $\gamma_i$ determined at step 622 or 2324 and stored, output, or noted at step 624 or 2326 can be used as the imperfection heading $\alpha_1$, imperfection pitch $\beta_i$, and imperfection roll $\gamma_i$, in step 520 in the process 500 of FIG. 5A to point the antenna 140 at a target 150. The process 500 will thus produce the cRPV 534 rather than merely the uRPV 532 as discussed above. The bore sight 210 will thus point substantially directly, or at least more directly, at the target 150 than if step 520 were not performed.

Although specific embodiments and applications of the invention have been described in this specification, these embodiments and applications are exemplary only, and many variations are possible. For example, although embodiments using two targets 702 and 704 and one target 702 are illustrated in the figures and discussed above, other embodiments can utilize a different number of targets. For example, some embodiments can utilize four targets (each of which can be like the targets 702 and 704) that are disposed in locations that are substantially orthogonal with respect to each other in the azimuth plane.

We claim:

1. A process for determining unknown offsets between a radio frequency (RF) antenna and a platform on which said antenna is mounted, said process comprising:

pointing said antenna at a first RF target in accordance with a first uncorrected relative pointing vector (uRPV1), wherein said uRPV1 does not account for said unknown offsets;

rotating said antenna in an azimuth plane while monitoring at one of said antenna or said first target a first test RF signal transmitted between said first target and said antenna to determine a first delta azimuth angle ($\Delta Az_1$) from said uRPV1 that corresponds to a peak strength of said first test signal at said one of said antenna or said first target;

rotating said antenna in elevation while monitoring at said one of said antenna or said first target said first test signal to determine a first delta elevation angle ($\Delta Ev_1$) from said uRPV1 that corresponds to a peak strength of said first test signal at said one of said antenna or said first target;

adding said $\Delta Az_1$ and said $\Delta Ev_1$ to said uRPV1 to produce a first corrected relative pointing vector (cRPV1);

pointing said antenna at a second RF target in accordance with a second uncorrected relative pointing vector (uRPV2), wherein said uRPV2 does not account for said unknown offsets;

rotating said antenna in said azimuth plane while monitoring at one of said antenna or said second target a second test RF signal transmitted between said second target and said antenna to determine a second delta azimuth angle ($\Delta Az_2$) from said uRPV2 that corresponds to a peak strength of said second test signal at said one of said antenna or said second target;

rotating said antenna in elevation while monitoring at said one of said antenna or said second target said second test signal to determine a second delta elevation angle ($\Delta Ev_2$) from said uRPV2 that corresponds to a peak strength of said second test signal at said one of said antenna or said second target;

adding said $\Delta Az_2$ and said $\Delta Ev_2$ to said uRPV2 to produce a second corrected relative pointing vector (cRPV2); and determining from said cRPV1 and said cRPV2 a heading angle ($\alpha_i$), a pitch angle ($\beta_i$), and a roll angle ($\gamma i$) of said unknown offsets.

2. The process of claim 1, wherein:
said platform comprises an orientation mechanism that provides an orientation of said platform, and
said unknown offsets are between said antenna and said orientation mechanism.

3. The process of claim 1 further comprising:
prior to said pointing said antenna at said first target, disposing said first target and said platform in stationary positions; and
prior to said pointing said antenna at said second target, disposing said second target in a stationary position in which an angle in said azimuth plane from said antenna between said first target and said second target is between sixty and one-hundred twenty degrees inclusive.

4. The process of claim 3 further comprising, after disposing said first target, said platform, and said second target in said stationary positions, determining locations in an earth fixed coordinate frame of said first target, said second target, and said antenna.

5. The process of claim 4 further comprising:
determining from said locations of said antenna and said first target a first earth pointing vector (EPV1) in said earth fixed coordinate frame from said antenna to said first target;
determining from said locations of said antenna and said second target a second earth pointing vector (EPV2) in said earth fixed coordinate frame from said antenna to said second target.

6. The process of claim 5 further comprising:
rotating said EPV1 by an orientation of said platform in said earth fixed coordinate frame and any known offsets between said antenna and said platform to produce said uRPV1; and
rotating said EPV2 by said orientation of said platform in said earth fixed coordinate frame and said any known offsets between said antenna and said platform to produce said uRPV2.

7. The process of claim 6 further comprising providing said orientation of said platform with an orientation mechanism attached to said platform.

8. The process of claim 6, wherein said determining from said cRPV1 and said cRPV2 a heading angle ($\alpha_i$), a pitch angle ($\beta_i$), and a roll angle ($\gamma_i$) of said unknown offsets comprises:
selecting a plurality of different sets of values for each of said heading angle ($\alpha_i$), said pitch angle ($\beta_i$), and said roll angle ($\gamma_i$) of said unknown offsets;
for each one of said different sets:
calculating a determined earth pointing vector (dEPV1) for said first target by rotating said cRPV1 backwards through said values of said roll angle ($\gamma_i$), said pitch angle ($\beta_i$), and said heading angle ($\alpha_i$) of said one of said sets to produce a first rotated cRPV1', rotating said first rotated cRPV1' backwards through said any known offsets to produce a second rotated cRPV1", and rotating said second rotated cRPV1" backwards through said orientation of said platform;
calculating a determined earth pointing vector (dEPV2) for said second target by rotating said cRPV2 backwards through said values of said roll angle ($\gamma_i$), said pitch angle ($\beta_i$), and said heading angle ($\alpha_i$) of said one of said sets to produce a first rotated cRPV2', rotating said first rotated cRPV2' backwards through said any known offsets to produce a second rotated cRPV2", and rotating said second rotated cRPV2" backwards through said orientation of said platform;
rating said one of said sets by comparing said dEPV1 to said EPV1 and comparing said dEPV2 to said EPV2.

9. The process of claim 8, wherein said rating comprises calculating an error value equal to a square root of a sum of the following differences squared:
an x component of said EPV1 subtracted from an x component of said dEPV1;
a y component of said EPV1 subtracted from an y component of said dEPV1;
a z component of said EPV1 subtracted from an z component of said dEPV1;
an x component of said EPV2 subtracted from an x component of said dEPV2;
a y component of said EPV2 subtracted from an y component of said dEPV2; and
a z component of said EPV2 subtracted from an z component of said dEPV2.

10. The process of claim 9, wherein said determining from said cRPV1 and said cRPV2 a heading angle ($\alpha_i$), a pitch angle ($\beta_i$), and a roll angle ($\gamma_i$) of said unknown offsets further comprises repeating said step of selecting a plurality of different sets of values until said error value is less than two times a sum of an uncertainty of said location of said first target or said location of said second target and said location of said antenna.

11. The process of claim 9, wherein said determining from said cRPV1 and said cRPV2 a heading angle ($\alpha_i$), a pitch angle ($\beta_i$), and a roll angle ($\gamma_i$) of said unknown offsets further comprises selecting one of said plurality of sets that has a smallest value of said error value.

12. The process of claim 1 further comprising storing said determined heading angle ($\alpha_i$), pitch angle ($\beta_i$), and roll angle ($\gamma_i$) in a digital electronic memory.

13. A process for determining unknown offsets between a radio frequency (RF) antenna and a platform on which said antenna is mounted, said process comprising:
disposing said platform in a first orientation in an earth fixed coordinate frame;
pointing said antenna at an RF target in accordance with a first uncorrected relative pointing vector (uRPV1), wherein said uRPV1 does not account for said unknown offsets;
rotating said antenna in an azimuth plane while monitoring at one of said antenna or said target a first test RF signal transmitted between said target and said antenna to determine a first delta azimuth angle ($\Delta Az_1$) from said uRPV1 that corresponds to a peak strength of said first test signal at said one of said antenna or said target;
rotating said antenna in elevation while monitoring at said one of said antenna or said target said first test signal to determine a first delta elevation angle ($\Delta Ev_1$) from said uRPV1 that corresponds to a peak strength of said first test signal at said one of said antenna or said first target;
adding said $\Delta Az_1$ and said $\Delta Ev_1$ to said uRPV1 to produce a first corrected relative pointing vector (cRPV1);
moving said platform into a second orientation in said earth fixed coordinate frame;
pointing said antenna at said target in accordance with a second uncorrected relative pointing vector (uRPV2), wherein said uRPV2 does not account for said unknown offsets;

rotating said antenna in said azimuth plane while monitoring at one of said antenna or said target a second test signal transmitted between said target and said antenna to determine a second delta azimuth angle ($\Delta Az_2$) from said uRPV2 that corresponds to a peak strength of said second test signal at said one of said antenna or said target;

rotating said antenna in elevation while monitoring at said one of said antenna or said target said second test signal to determine a second delta elevation angle ($\Delta Ev_2$) from said uRPV2 that corresponds to a peak strength of said second test signal at said one of said antenna or said target;

adding said $\Delta Az_2$ and said $\Delta Ev_2$ to said uRPV2 to produce a second corrected relative pointing vector (cRPV2); and determining from said cRPV1 and said cRPV2 a heading angle ($\alpha_i$), a pitch angle ($\beta_i$), and a roll angle ($\gamma_i$) of said unknown offsets.

14. The process of claim 13, wherein:
said platform comprises an orientation mechanism that provides an orientation of said platform, and
said unknown offsets are between said antenna and said orientation mechanism.

15. The process of claim 13 further comprising disposing said target in a stationary position in said earth fixed coordinate frame.

16. The process of claim 15 further comprising, after disposing said target in said stationary position, determining locations in said earth fixed coordinate frame of said target and said antenna.

17. The process of claim 16 further comprising determining from said locations of said antenna and said target an earth pointing vector (EPV) in said earth fixed coordinate frame from said antenna to said target.

18. The process of claim 17 further comprising:
rotating said EPV by said first orientation of said platform in said earth fixed coordinate frame and any known offsets between said antenna and said platform to produce said uRPV1; and
rotating said EPV by said second orientation of said platform in said earth fixed coordinate frame and said any known offsets between said antenna and said platform to produce said uRPV2.

19. The process of claim 17, wherein said determining from said cRPV1 and said cRPV2 a heading angle ($\alpha_i$), a pitch angle ($\beta_i$), and a roll angle ($\gamma_i$) of said unknown offsets comprises:
selecting a plurality of different sets of values for each of said heading angle ($\alpha_i$), said pitch angle ($\beta_i$), and said roll angle ($\gamma_i$) of said unknown offsets;
for each one of said different sets:
calculating a first determined earth pointing vector (dEPV1) for said target by rotating said cRPV1 backwards through said values of said roll angle ($\gamma_i$), said pitch angle ($\beta_i$), and said heading angle ($\alpha_i$) of said one of said sets to produce a first rotated cRPV1', rotating said first rotated cRPV1' backwards through said any known offsets to produce a second rotated cRPV1'', and rotating said second cRPV1'' backwards through said first orientation of said platform;
calculating a second determined earth pointing vector (dEPV2) for said target by rotating said cRPV2 backwards through said values of said roll angle ($\gamma_i$), said pitch angle ($\beta_i$), and said heading angle ($\alpha_i$) of said one of said sets to produce a first rotated cRPV2', rotating said first rotated cRPV2' backwards through said any known offsets to produce a second rotated cRPV2'', and rotating said second cRPV2'' backwards through said second orientation of said platform;
rating said one of said sets by comparing said dEPV1 to said EPV and comparing said dEPV2 to said EPV.

20. The process of claim 19, wherein said rating comprises calculating an error value equal to a square root of a sum of the following differences squared:
an x component of said EPV1 subtracted from an x component of said dEPV1;
a y component of said EPV1 subtracted from an y component of said dEPV1;
a z component of said EPV1 subtracted from an z component of said dEPV1;
an x component of said EPV2 subtracted from an x component of said dEPV2;
a y component of said EPV2 subtracted from an y component of said dEPV2; and
a z component of said EPV2 subtracted from an z component of said dEPV2.

21. The process of claim 20, wherein said determining from said cRPV1 and said cRPV2 a heading angle ($\alpha_i$), a pitch angle ($\beta_i$), and a roll angle ($\gamma_i$) of said unknown offsets further comprises repeating said step of selecting a plurality of different sets of values until said error value is less than two times a sum of an uncertainty of said location of said target and said location of said antenna.

22. The process of claim 19, wherein said determining from said cRPV1 and said cRPV2 a heading angle ($\alpha_i$), a pitch angle ($\beta_i$), and a roll angle ($\gamma_i$) of said unknown offsets further comprises selecting one of said plurality of sets that has a smallest value of said error value.

23. The process of claim 13 further comprising storing said determined heading angle ($\alpha_i$), pitch angle ($\beta_i$), and roll angle ($\gamma_i$) in a digital electronic memory.

24. The process of claim 13, wherein said moving said platform into a second orientation in said earth fixed coordinate frame comprises rotating said platform in said azimuth plane between sixty and one-hundred and twenty degrees inclusive.

* * * * *